US006798972B1

(12) United States Patent
Ito et al.

(10) Patent No.: US 6,798,972 B1
(45) Date of Patent: Sep. 28, 2004

(54) IMAGE REPRODUCING APPARATUS AND IMAGE REPRODUCING METHOD

(75) Inventors: Norikazu Ito, Kanagawa (JP); Satoshi Yoneya, Kanagawa (JP); Masakazu Yoshimoto, Kanagawa (JP); Satoshi Katsuo, Kanagawa (JP); Jun Yoshikawa, Kanagawa (JP); Shouji Nakamura, Kanagawa (JP); Tomohisa Shiga, Kanagawa (JP); Masaki Hirose, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/534,695

(22) Filed: Mar. 24, 2000

(30) Foreign Application Priority Data

Mar. 26, 1999 (JP) ............................................ 11-082971

(51) Int. Cl.[7] ................................................. H04N 5/91
(52) U.S. Cl. ......................................... 386/68; 386/125
(58) Field of Search .............................. 386/46, 95, 98, 386/109, 112, 125, 126, 68, 70

(56) References Cited

U.S. PATENT DOCUMENTS 5,719,985 A * 2/1998 Ito et al. ..................... 386/109
6,292,626 B1 * 9/2001 Ino et al. ..................... 386/125
6,301,432 B2 * 10/2001 Miyawaki et al. ........... 386/113
6,351,597 B2 * 2/2002 Yutani ........................... 386/65
6,360,058 B1 * 3/2002 Yoshimoto et al. .......... 386/116
6,453,117 B1 * 9/2002 Ito et al. ........................ 386/70
2003/0128967 A1 * 7/2003 Ito et al. ........................ 386/68

FOREIGN PATENT DOCUMENTS

JP           410285558 A   * 10/1998

* cited by examiner

*Primary Examiner*—Huy Nguyen
(74) *Attorney, Agent, or Firm*—Frommer Lawrence & Haug LLP; William S. Frommer; Samuel S. Lee

(57) ABSTRACT

There is provided an image reproducing apparatus and an image reproducing method which allow reproducing speed to be shifted instantly when a change of the reproducing speed is requested in a multi-channel AV (Audio Visual) server. When a request to reproduce an image is made, the image reproducing apparatus reads image data of the part corresponding to the requested reproducing speed out of the HDDs to store in a temporary storage section. Then, an image output I/F reads the image data stored in the temporary storage section and structures a reproduced image by using the image data. In this case, a controller section controls a pattern in reading the divisional data by the image output I/F and structures a reproduced image by means of various reproducing speeds by this reading pattern.

7 Claims, 18 Drawing Sheets

FIG. 5A

| A |
|---|
| B |
| C |
| D |

FIG. 5B

| A | B |
|---|---|
| C | D |

FIG. 5C

| A | B | C | D | A |
|---|---|---|---|---|
| B | C | D | A | B |
| C | D | A | B | C |
| D | A | B | C | D |

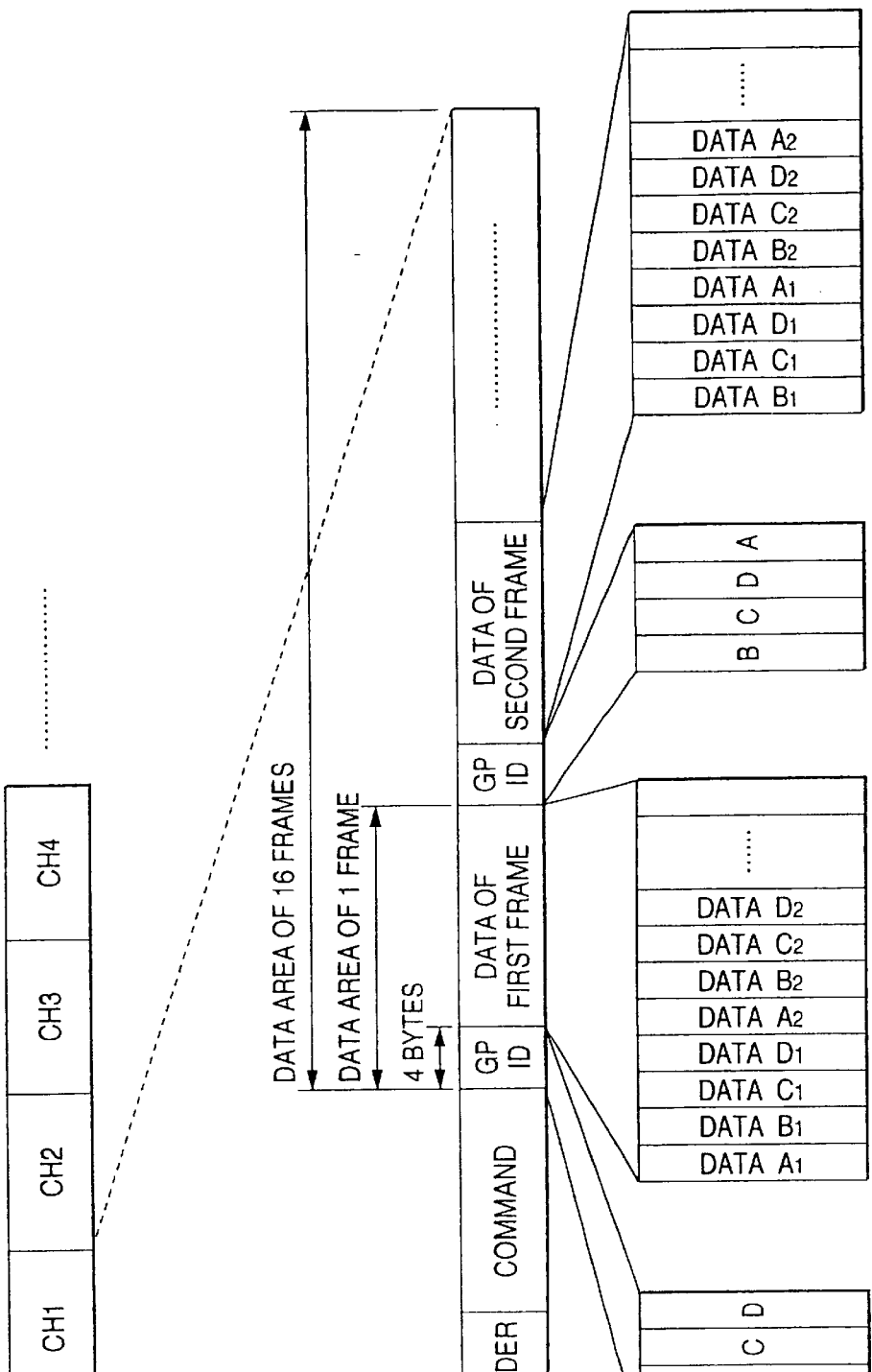

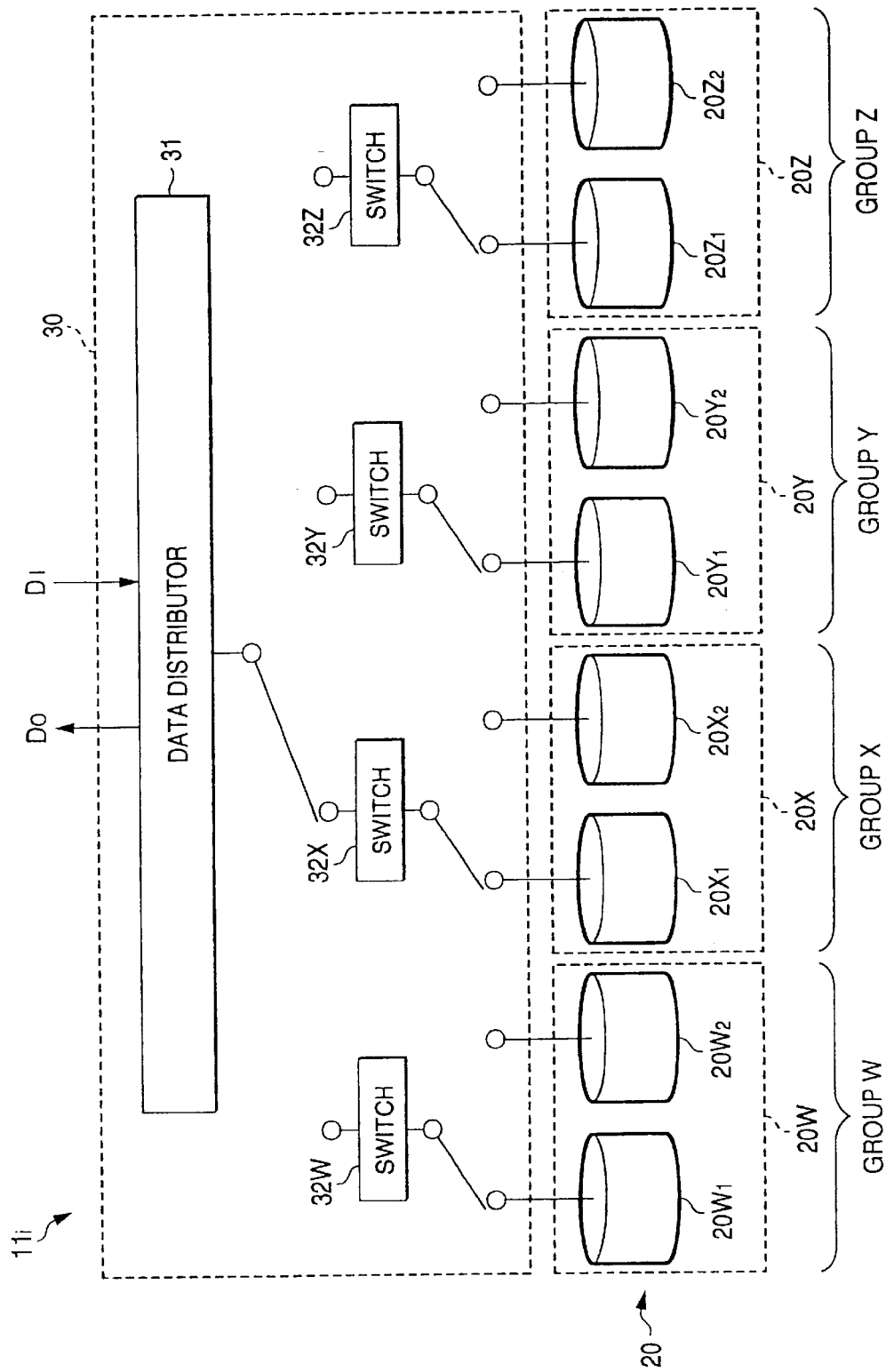

FIG. 8

| HDD_Gp_W | HDD_Gp_X | HDD_Gp_Y | HDD_Gp_Z |
|---|---|---|---|
| 1 - MA | 1 - MB | 1 - MC | 1   MD |
| 2   MB | 2 - MC | 2   MD | 2   MA |
| 3   MC | 3   MD | 3 - MA | 3   MB |
| 4 - MD | 4   MA | 4 - MB | 4 - MC |
| 5 - MA | 5 - MB | 5   MC | 5 - MD |
| 6 - MB | 6 - MC | 6   MD | 6   MA |
| 7   MC | 7 - MD | 7 - MA | 7   MB |
| 8 - MD | 8 - MA | 8   MB | 8 - MC |
| 9 - MA | 9 - MB | 9 - MC | 9   MD |
| 10   MB | 10   MC | 10 - MD | 10   MA |
| 11 - MC | 11   MD | 11 - MA | 11 - MB |
| 12 - MD | 12 - MA | 12   MB | 12 - MC |
| 13   MA | 13   MB | 13 - MC | 13 - MD |
| 14 - MB | 14 - MC | 14   MD | 14 - MA |
| 15 - MC | 15 - MD | 15   MA | 15   MB |
| 16   MD | 16   MA | 16 - MB | 16   MC |
| 17 - MA | 17 - MB | 17   MC | 17 - MD |
| 18 - MB | 18 - MC | 18   MD | 18   MA |
| 19 - MC | 19   MD | 19 - MA | 19 - MB |
| 20 - MD | 20 - MA | 20   MB | 20   MC |
| 21   MA | 21 - MB | 21   MC | 21   MD |
| 22   MB | 22   MC | 22 - MD | 22 - MA |
| 23 - MC | 23 - MD | 23   MA | 23   MB |
| 24 - MD | 24   MA | 24   MB | 24 - MC |
| 25   MA | 25 - MB | 25   MC | 25   MD |
| 26   MB | 26   MC | 26   MD | 26   MA |
| 27 - MC | 27 - MD | 27   MA | 27   MB |
| 28   MD | 28   MA | 28 - MB | 28 - MC |
| 29 - MA | 29 - MB | 29   MC | 29   MD |
| 30   MB | 30   MC | 30 - MD | 30   MA |
| 31 - MC | 31 - MD | 31   MA | 31   MB |
| 32   MD | 32 - MA | 32   MB | 32   MC |
| 33   MA | 33   MB | 33 - MC | 33 - MD |
| 34 - MB | 34 - MC | 34   MD | 34   MA |
| 35   MC | 35   MD | 35 - MA | 35   MB |
| 36 - MD | 36   MA | 36   MB | 36   MC |
| 37 - MA | 37 - MB | 37   MC | 37   MD |
| 38   MB | 38 - MC | 38 - MD | 38 - MA |
| 39 - MC | 39   MD | 39   MA | 39 - MB |
| 40   MD | 40 - MA | 40   MB | 40   MC |
| 41   MA | 41   MB | 41   MC | 41 - MD |
| 42 - MB | 42 - MC | 42   MD | 42   MA |
| 43 - MC | 43 - MD | 43 - MA | 43   MB |
| 44   MD | 44   MA | 44 - MB | 44   MC |
| 45 - MA | 45 - MB | 45   MC | 45   MD |
| 46   MB | 46 - MC | 46   MD | 46   MA |
| 47   MC | 47   MD | 47 - MA | 47 - MB |
| 48   MD | 48   MA | 48 - MB | 48 - MC |
| 49   MA | 49   MB | 49   MC | 49 - MD |
| 50 - MB | 50   MC | 50   MD | 50 - MA |
| 51 - MC | 51 - MD | 51   MA | 51   MB |
| 52   MD | 52 - MA | 52   MB | 52   MC |
| 53   MA | 53   MB | 53   MC | 53   MD |
| 54 - MB | 54 - MC | 54 - MD | 54   MA |
| 55   MC | 55   MD | 55 - MA | 55   MB |
| 56   MD | 56   MA | 56   MB | 56 - MC |
| 57 - MA | 57 - MB | 57   MC | 57   MD |
| 58 - MB | 58 - MC | 58   MD | 58   MA |
| 59 - MC | 59 - MD | 59   MA | 59   MB |
| 60   MD | 60 - MA | 60 - MB | 60   MC |
| 61   MA | 61   MB | 61 - MC | 61 - MD |
| 62 - MB | 62   MC | 62   MD | 62 - MA |
| 63 - MC | 63   MD | 63   MA | 63   MB |
| 64 - MD | 64 - MA | 64   MB | 64   MC |

FIG. 9

AT TIME OF SINGLE-SPEED

| | HDD_Gp_W | HDD_Gp_X | HDD_Gp_Y | HDD_Gp_Z |
|---|---|---|---|---|
| OWN TIME SLOT n | 1  MA | 1 - MB | 1  MC | 1  MD |
| | 2  MB | 2 - MC | 2 - MD | 2 - MA |
| | 3 - MC | 3  MD | 3 - MA | 3 - MB |
| | 4 - MD | 4  MA | 4 - MB | 4 - MC |
| | 5 - MA | 5  MB | 5  MC | 5 - MD |
| | 6  MB | 6 - MC | 6  MD | 6 - MA |
| | 7  MC | 7 - MD | 7 - MA | 7  MB |
| | 8 - MD | 8 - MA | 8  MB | 8 - MC |
| | 9  MA | 9 - MB | 9 - MC | 9  MD |
| | 10  MB | 10  MC | 10 - MD | 10  MA |
| | 11 - MC | 11  MD | 11 - MA | 11 - MB |
| | 12 - MD | 12 - MA | 12  MB | 12 - MC |
| | 13 - MA | 13  MB | 13 - MC | 13  MD |
| | 14  MB | 14  MC | 14  MD | 14 - MA |
| | 15  MC | 15 - MD | 15 - MA | 15  MB |
| | 16  MD | 16 - MA | 16 - MB | 16 - MC |
| OWN TIME SLOT n + 1 | 17 - MA | 17 - MB | 17  MC | 17 - MD |
| | 18  MB | 18 - MC | 18  MD | 18  MA |
| | 19 - MC | 19  MD | 19  MA | 19 - MB |
| | 20 - MD | 20 - MA | 20  MB | 20 - MC |
| | 21  MA | 21 - MB | 21 - MC | 21  MD |
| | 22 - MB | 22  MC | 22  MD | 22 - MA |
| | 23  MC | 23 - MD | 23  MA | 23  MB |
| | 24 - MD | 24  MA | 24  MB | 24 - MC |
| | 25  MA | 25 - MB | 25  MC | 25  MD |
| | 26  MB | 26  MC | 26 - MD | 26 - MA |
| | 27 - MC | 27 - MD | 27  MA | 27  MB |
| | 28 - MD | 28  MA | 28 - MB | 28 - MC |
| | 29  MA | 29 - MB | 29  MC | 29  MD |
| | 30  MB | 30  MC | 30 - MD | 30 - MA |
| | 31 - MC | 31  MD | 31  MA | 31 - MB |
| | 32  MD | 32 - MA | 32 - MB | 32  MC |
| OWN TIME SLOT n + 2 | 33 - MA | 33  MB | 33  MC | 33 - MD |
| | 34 - MB | 34  MC | 34  MD | 34  MA |
| | 35  MC | 35  MD | 35 - MA | 35 - MB |
| | 36 - MD | 36  MA | 36  MB | 36 - MC |
| | 37 - MA | 37 - MB | 37 - MC | 37  MD |
| | 38  MB | 38  MC | 38 - MD | 38  MA |
| | 39 - MC | 39  MD | 39  MA | 39 - MB |
| | 40  MD | 40 - MA | 40 - MB | 40  MC |
| | 41 - MA | 41  MB | 41  MC | 41 - MD |
| | 42 - MB | 42 - MC | 42  MD | 42  MA |
| | 43  MC | 43 - MD | 43 - MA | 43  MB |
| | 44  MD | 44  MA | 44 - MB | 44 - MC |
| | 45 - MA | 45 - MB | 45  MC | 45  MD |
| | 46  MB | 46 - MC | 46 - MD | 46  MA |
| | 47  MC | 47  MD | 47 - MA | 47 - MB |
| | 48  MD | 48  MA | 48  MB | 48 - MC |
| OWN TIME SLOT n + 3 | 49 - MA | 49  MB | 49  MC | 49 - MD |
| | 50 - MB | 50  MC | 50  MD | 50  MA |
| | 51  MC | 51 - MD | 51  MA | 51  MB |
| | 52  MD | 52 - MA | 52 - MB | 52  MC |
| | 53  MA | 53 - MB | 53 - MC | 53  MD |
| | 54  MB | 54 - MC | 54 - MD | 54  MA |
| | 55  MC | 55  MD | 55 - MA | 55 - MB |
| | 56 - MD | 56  MA | 56  MB | 56 - MC |
| | 57 - MA | 57 - MB | 57 - MC | 57  MD |
| | 58 - MB | 58 - MC | 58  MD | 58  MA |
| | 59  MC | 59  MD | 59 - MA | 59  MB |
| | 60  MD | 60 - MA | 60 - MB | 60 - MC |
| | 61 - MA | 61  MB | 61  MC | 61 - MD |
| | 62 - MB | 62  MC | 62  MD | 62 - MA |
| | 63 - MC | 63  MD | 63  MA | 63 - MB |
| | 64 - MD | 64 - MA | 64  MB | 64  MC |

FIG. 10

AT TIME OF SINGLE-SPEED

| | SDRAM_Gp_W | SDRAM_Gp_X | SDRAM_Gp_Y | SDRAM_Gp_Z |
|---|---|---|---|---|
| OWN TIME SLOT n | 1 – MA | 1 – MB | 1 – MC | 1 – MD |
| | 2 – MB | 2 – MC | 2 – MD | 2 – MA |
| | 3 – MC | 3 – MD | 3 – MA | 3 – MB |
| | 4 – MD | 4 – MA | 4 – MB | 4 – MC |
| | 5 – MA | 5 – MB | 5 – MC | 5 – MD |
| | 6 – MB | 6 – MC | 6 – MD | 6 – MA |
| | 7 – MC | 7 – MD | 7 – MA | 7 – MB |
| | 8 – MD | 8 – MA | 8 – MB | 8 – MC |
| | 9 – MA | 9 – MB | 9 – MC | 9 – MD |
| | 10 – MB | 10 – MC | 10 – MD | 10 – MA |
| | 11 – MC | 11 – MD | 11 – MA | 11 – MB |
| | 12 – MD | 12 – MA | 12 – MB | 12 – MC |
| | 13 – MA | 13 – MB | 13 – MC | 13 – MD |
| | 14 – MB | 14 – MC | 14 – MD | 14 – MA |
| | 15 – MC | 15 – MD | 15 – MA | 15 – MB |
| | 16 – MD | 16 – MA | 16 – MB | 16 – MC |

FIG. 11

AT TIME OF DOUBLE-SPEED

| | HDD_Gp_W | HDD_Gp_X | HDD_Gp_Y | HDD_Gp_Z |
|---|---|---|---|---|
| OWN TIME SLOT n | 1 - MA | 1   MB | 1 - MC | 1   MD |
| | 2 - MB | 2   MC | 2 - MD | 2   MA |
| | 3   MC | 3 - MD | 3   MA | 3 - MB |
| | 4   MD | 4 - MA | 4   MB | 4 - MC |
| | 5   MA | 5 - MB | 5   MC | 5 - MD |
| | 6 - MB | 6   MC | 6 - MD | 6   MA |
| | 7 - MC | 7   MD | 7 - MA | 7   MB |
| | 8   MD | 8 - MA | 8   MB | 8   MC |
| | 9 - MA | 9   MB | 9 - MC | 9   MD |
| | 10 - MB | 10   MC | 10 - MD | 10 - MA |
| | 11   MC | 11 - MD | 11   MA | 11 - MB |
| | 12 - MD | 12   MA | 12 - MB | 12   MC |
| | 13 - MA | 13 - MB | 13   MC | 13 - MD |
| | 14   MB | 14 - MC | 14   MD | 14 - MA |
| | 15 - MC | 15   MD | 15 - MA | 15   MB |
| | 16 - MD | 16 - MA | 16   MB | 16   MC |
| | 17 - MA | 17 - MB | 17   MC | 17 - MD |
| | 18 - MB | 18   MC | 18 - MD | 18   MA |
| | 19   MC | 19 - MD | 19   MA | 19 - MB |
| | 20   MD | 20 - MA | 20 - MB | 20   MC |
| | 21 - MA | 21   MB | 21 - MC | 21   MD |
| | 22   MB | 22 - MC | 22   MD | 22 - MA |
| | 23 - MC | 23   MD | 23 - MA | 23   MB |
| | 24   MD | 24 - MA | 24   MB | 24 - MC |
| | 25 - MA | 25   MB | 25 - MC | 25   MD |
| | 26   MB | 26 - MC | 26   MD | 26 - MA |
| | 27 - MC | 27   MD | 27 - MA | 27   MB |
| | 28   MD | 28 - MA | 28   MB | 28 - MC |
| | 29 - MA | 29   MB | 29 - MC | 29   MD |
| | 30   MB | 30   MC | 30   MD | 30 - MA |
| | 31   MC | 31 - MD | 31 - MA | 31   MB |
| | 32 - MD | 32   MA | 32 - MB | 32   MC |
| OWN TIME SLOT n + 1 | 33   MA | 33 - MB | 33   MC | 33 - MD |
| | 34   MB | 34 - MC | 34 - MD | 34   MA |
| | 35   MC | 35   MD | 35   MA | 35 - MB |
| | 36   MD | 36 - MA | 36   MB | 36   MC |
| | 37 - MA | 37   MB | 37 - MC | 37   MD |
| | 38 - MB | 38   MC | 38   MD | 38 - MA |
| | 39   MC | 39 - MD | 39   MA | 39 - MB |
| | 40 - MD | 40   MA | 40 - MB | 40 - MC |
| | 41 - MA | 41 - MB | 41   MC | 41 - MD |
| | 42   MB | 42   MC | 42 - MD | 42   MA |
| | 43 - MC | 43   MD | 43 - MA | 43   MB |
| | 44 - MD | 44   MA | 44   MB | 44 - MC |
| | 45   MA | 45   MB | 45 - MC | 45   MD |
| | 46 - MB | 46   MC | 46 - MD | 46   MA |
| | 47 - MC | 47   MD | 47   MA | 47   MB |
| | 48 - MD | 48   MA | 48   MB | 48 - MC |
| | 49   MA | 49 - MB | 49   MC | 49   MD |
| | 50   MB | 50   MC | 50   MD | 50   MA |
| | 51   MC | 51   MD | 51 - MA | 51   MB |
| | 52 - MD | 52   MA | 52 - MB | 52   MC |
| | 53 - MA | 53   MB | 53   MC | 53   MD |
| | 54 - MB | 54   MC | 54   MD | 54   MA |
| | 55 - MC | 55   MD | 55   MA | 55 - MB |
| | 56   MD | 56 - MA | 56   MB | 56   MC |
| | 57   MA | 57   MB | 57 - MC | 57   MD |
| | 58   MB | 58   MC | 58 - MD | 58   MA |
| | 59   MC | 59   MD | 59 - MA | 59   MB |
| | 60 - MD | 60   MA | 60   MB | 60   MC |
| | 61 - MA | 61 - MB | 61   MC | 61 - MD |
| | 62   MB | 62 - MC | 62   MD | 62 - MA |
| | 63   MC | 63 - MD | 63 - MA | 63   MB |
| | 64   MD | 64 - MA | 64 - MB | 64   MC |

FIG. 12

AT TIME OF DOUBLE-SPEED

| OWN TIME SLOT n | SDRAM_Gp_W | SDRAM_Gp_X | SDRAM_Gp_Y | SDRAM_Gp_Z |
|---|---|---|---|---|
| | 1 – MA | 17 – MB | 1 – MC | 17 – MD |
| | 2 – MB | 18 – MC | 2 – MD | 18 – MA |
| | 3 – MC | 19 – MD | 3 – MA | 19 – MB |
| | 4 – MD | 20 – MA | 4 – MB | 20 – MC |
| | 5 – MA | 21 – MB | 5 – MC | 21 – MD |
| | 6 – MB | 22 – MC | 6 – MD | 22 – MA |
| | 7 – MC | 23 – MD | 7 – MA | 23 – MB |
| | 8 – MD | 24 – MA | 8 – MB | 24 – MC |
| | 9 – MA | 25 – MB | 9 – MC | 25 – MD |
| | 10 – MB | 26 – MC | 10 – MD | 26 – MA |
| | 11 – MC | 27 – MD | 11 – MA | 27 – MB |
| | 12 – MD | 28 – MA | 12 – MB | 28 – MC |
| | 13 – MA | 29 – MB | 13 – MC | 29 – MD |
| | 14 – MB | 30 – MC | 14 – MD | 30 – MA |
| | 15 – MC | 31 – MD | 15 – MA | 31 – MB |
| | 16 – MD | 32 – MA | 16 – MB | 32 – MC |

FIG. 13   AT TIME OF QUADRUPLE-SPEED

| | HDD_Gp_W | HDD_Gp_X | HDD_Gp_Y | HDD_Gp_Z |
|---|---|---|---|---|
| | 1 - MA | 1   MB | 1 - MC | 1   MD |
| | 2   MB | 2 - MC | 2 - MD | 2 - MA |
| | 3   MC | 3 - MD | 3   MA | 3 - MB |
| | 4 - MD | 4   MA | 4   MB | 4 - MC |
| | 5 - MA | 5   MB | 5 - MC | 5 - MD |
| | 6 - MB | 6   MC | 6 - MD | 6   MA |
| | 7 - MC | 7 - MD | 7   MA | 7   MB |
| | 8 - MD | 8   MA | 8 - MB | 8   MC |
| | 9 - MA | 9   MB | 9   MC | 9   MD |
| | 10   MB | 10 - MC | 10   MD | 10 - MA |
| | 11   MC | 11 - MD | 11 - MA | 11 - MB |
| | 12 - MD | 12   MA | 12 - MB | 12   MC |
| | 13   MA | 13 - MB | 13   MC | 13 - MD |
| | 14 - MB | 14   MC | 14 - MD | 14   MA |
| | 15 - MC | 15   MD | 15 - MA | 15 - MB |
| | 16   MD | 16 - MA | 16   MB | 16 - MC |
| | 17 - MA | 17   MB | 17 - MC | 17   MD |
| | 18 - MB | 18   MC | 18 - MD | 18   MA |
| | 19   MC | 19   MD | 19   MA | 19 - MB |
| | 20 - MD | 20   MA | 20 - MB | 20   MC |
| | 21 - MA | 21 - MB | 21   MC | 21 - MD |
| | 22   MB | 22   MC | 22 - MD | 22   MA |
| | 23 - MC | 23   MD | 23 - MA | 23   MB |
| | 24   MD | 24   MA | 24 - MB | 24 - MC |
| | 25   MA | 25   MB | 25 - MC | 25 - MD |
| | 26   MB | 26 - MC | 26   MD | 26   MA |
| | 27 - MC | 27   MD | 27 - MA | 27   MB |
| | 28   MD | 28 - MA | 28   MB | 28 - MC |
| | 29 - MA | 29   MB | 29   MC | 29   MD |
| | 30   MB | 30 - MC | 30   MD | 30 - MA |
| | 31 - MC | 31   MD | 31 - MA | 31   MB |
| OWN TIME SLOT n | 32 - MD | 32 - MA | 32   MB | 32   MC |
| | 33   MA | 33   MB | 33   MC | 33   MD |
| | 34 - MB | 34   MC | 34 - MD | 34   MA |
| | 35   MC | 35 - MD | 35   MA | 35 - MB |
| | 36   MD | 36   MA | 36 - MB | 36   MC |
| | 37 - MA | 37   MB | 37   MC | 37   MD |
| | 38   MB | 38 - MC | 38   MD | 38 - MA |
| | 39   MC | 39   MD | 39 - MA | 39   MB |
| | 40 - MD | 40 - MA | 40   MB | 40 - MC |
| | 41   MA | 41 - MB | 41 - MC | 41   MD |
| | 42 - MB | 42   MC | 42 - MD | 42   MA |
| | 43   MC | 43   MD | 43   MA | 43 - MB |
| | 44   MD | 44 - MA | 44   MB | 44 - MC |
| | 45 - MA | 45   MB | 45 - MC | 45   MD |
| | 46 - MB | 46 - MC | 46   MD | 46   MA |
| | 47   MC | 47 - MD | 47   MA | 47   MB |
| | 48   MD | 48   MA | 48   MB | 48 - MC |
| | 49   MA | 49   MB | 49 - MC | 49   MD |
| | 50 - MB | 50   MC | 50 - MD | 50   MA |
| | 51 - MC | 51   MD | 51   MA | 51   MB |
| | 52   MD | 52 - MA | 52   MB | 52 - MC |
| | 53 - MA | 53 - MB | 53   MC | 53   MD |
| | 54   MB | 54 - MC | 54   MD | 54 - MA |
| | 55   MC | 55 - MD | 55   MA | 55 - MB |
| | 56   MD | 56   MA | 56 - MB | 56   MC |
| | 57 - MA | 57   MB | 57 - MC | 57   MD |
| | 58 - MB | 58   MC | 58   MD | 58   MA |
| | 59 - MC | 59   MD | 59   MA | 59 - MB |
| | 60 - MD | 60 - MA | 60   MB | 60 - MC |
| | 61   MA | 61 - MB | 61   MC | 61   MD |
| | 62   MB | 62   MC | 62 - MD | 62   MA |
| | 63   MC | 63   MD | 63 - MA | 63   MB |
| | 64 - MD | 64   MA | 64 - MB | 64   MC |

FIG. 14

AT TIME OF QUADRUPLE-SPEED

| | SDRAM_Gp_W | SDRAM_Gp_X | SDRAM_Gp_Y | SDRAM_Gp_Z |
|---|---|---|---|---|
| OWN TIME SLOT n | 1 – MA | 17 – MB | 33 – MC | 49 – MD |
| | 2 – MB | 18 – MC | 34 – MD | 50 – MA |
| | 3 – MC | 19 – MD | 35 – MA | 51 – MB |
| | 4 – MD | 20 – MA | 36 – MB | 52 – MC |
| | 5 – MA | 21 – MB | 37 – MC | 53 – MD |
| | 6 – MB | 22 – MC | 38 – MD | 54 – MA |
| | 7 – MC | 23 – MD | 39 – MA | 55 – MB |
| | 8 – MD | 24 – MA | 40 – MB | 56 – MC |
| | 9 – MA | 25 – MB | 41 – MC | 57 – MD |
| | 10 – MB | 26 – MC | 42 – MD | 58 – MA |
| | 11 – MC | 27 – MD | 43 – MA | 59 – MB |
| | 12 – MD | 28 – MA | 44 – MB | 60 – MC |
| | 13 – MA | 29 – MB | 45 – MC | 61 – MD |
| | 14 – MB | 30 – MC | 46 – MD | 62 – MA |
| | 15 – MC | 31 – MD | 47 – MA | 63 – MB |
| | 16 – MD | 32 – MA | 48 – MB | 64 – MC |

FIG. 15A

AT TIME OF PSEUDO DOUBLE-SPEED

OWN TIME SLOT n

| SDRAM_Gp_W | SDRAM_Gp_X | SDRAM_Gp_Y | SDRAM_Gp_Z |
|---|---|---|---|
| Fram1  1 – MA | 17 – MB | 33 – MC | 49 – MD |
| Fram2  2 – MB | 18 – MC | 34 – MD | 50 – MA |
| 3 – MC | 19 – MD | 35 – MA | 51 – MB |
| 4 – MD | 20 – MA | 36 – MB | 52 – MC |
| 5 – MA | 21 – MB | 37 – MC | 53 – MD |
| 6 – MB | 22 – MC | 38 – MD | 54 – MA |
| 7 – MC | 23 – MD | 39 – MA | 55 – MB |
| 8 – MD | 24 – MA | 40 – MB | 56 – MC |
| 9 – MA | 25 – MB | 41 – MC | 57 – MD |
| 10 – MB | 26 – MC | 42 – MD | 58 – MA |
| 11 – MC | 27 – MD | 43 – MA | 59 – MB |
| 12 – MD | 28 – MA | 44 – MB | 60 – MC |
| 13 – MA | 29 – MB | 45 – MC | 61 – MD |
| 14 – MB | 30 – MC | 46 – MD | 62 – MA |
| 15 – MC | 31 – MD | 47 – MA | 63 – MB |
| 16 – MD | 32 – MA | 48 – MB | 64 – MC |

FIG. 15B

AT TIME OF PSEUDO SINGLE-SPEED

OWN TIME SLOT n

| SDRAM_Gp_W | SDRAM_Gp_X | SDRAM_Gp_Y | SDRAM_Gp_Z |
|---|---|---|---|
| Fram1  1 _ MA | 17 _ MB | 33 _ MC | 49 _ MD |
| Fram2  2 _ MB | 18 _ MC | 34 _ MD | 50 _ MA |
| 3 _ MC | 19 _ MD | 35 _ MA | 51 _ MB |
| 4 _ MD | 20 _ MA | 36 _ MB | 52 _ MC |
| 5 _ MA | 21 _ MB | 37 _ MC | 53 _ MD |
| 6 _ MB | 22 _ MC | 38 _ MD | 54 _ MA |
| 7 _ MC | 23 _ MD | 39 _ MA | 55 _ MB |
| 8 _ MD | 24 _ MA | 40 _ MB | 56 _ MC |
| 9 _ MA | 25 _ MB | 41 _ MC | 57 _ MD |
| 10 _ MB | 26 _ MC | 42 _ MD | 58 _ MA |
| 11 _ MC | 27 _ MD | 43 _ MA | 59 _ MB |
| 12 _ MD | 28 _ MA | 44 _ MB | 60 _ MC |
| 13 _ MA | 29 _ MB | 45 _ MC | 61 _ MD |
| 14 _ MB | 30 _ MC | 46 _ MD | 62 _ MA |
| 15 _ MC | 31 _ MD | 47 _ MA | 63 _ MB |
| 16 _ MD | 32 _ MA | 48 _ MB | 64 _ MC |

IMAGE REPRODUCING APPARATUS AND IMAGE REPRODUCING METHOD

BACKGROUND OF THE INVENTION

1. Field of the Invention

The present invention relates to an image reproducing apparatus and an image reproducing method for improving the controllability of an AV (Audio Visual) server or the like for recording/reproducing image data in reproducing image data.

2. Description of the Related Art

The demand for reproducing a plurality of image and audio data simultaneously from one recording/reproducing apparatus, differing from a conventional VTR (Video Tape Recorder), is growing with the late progress of multi-channelization in providing information due to the dissemination of CATV. (Cable Television) and the like. Then, in order to meet with this demand, an apparatus called an AV server (or a video server) for recording/reproducing image and audio data by using randomly accessible recording media such as a hard disk is now spreading.

For instance, an AV server installed in a broadcasting station is required to have a high data transfer rate in order to keep image and sound quality at certain level or more. It is also required to be able to record a large amount of data in order to broadcast for a long period of time and to have high reliability so as not to interrupt the broadcasting.

Then, the AV server is arranged so as to be able to increase the data transfer rate and the storage capacity by using a recording/reproducing apparatus containing a plurality of HDDs (Hard Disk Drives) which can be operated in parallel and to be able to assure the reliability, even if either one HDD happens to malfunctions, by restoring data by recording parity data.

By the way, an AV server called a multi-channel AV server which can accommodate to various use modes has come to be realized lately to be used in sending a plurality of recorded material data simultaneously through multi-channels or in constructing an NVOD (Near Video On Demand) system for reproducing the same material data through multi-channels by shifting reproducing time.

Technology of RAID (Redundant Arrays of Inexpensive Disks) which was advocated in a paper presented by Patterson et. al., in 1988 (Patterson, D. A., Gibson, G., Kats, R. H., "A Case for Redundant Arrays of Inexpensive Disk (RAID)" ACM SIGMOD Conference, Chicago, Ill., Jun. 1–3, 1988) is used in the recording/reproducing apparatus used in such multi-channel AV server. While RAID is categorized into five RAID-1 through RAID-5 in the paper, the typical ones are RAID-1, RAID-3 and RAID-5. It is noted although there is a category of RAID-0 as a category in terms of the explanation, it is a mode for operating a plurality of hard disks in parallel.

The RAID-1 is a mode of writing the same contents in two hard disks and the RAID-3 is a mode of recording input data in a plurality of HDDs by dividing it into data of certain length and of generating and writing parity data into another one HDD. The RAID-5 is a mode of recording one divisional data in one HDD as data block by dividing the data into large unit (block), of recording the result of an exclusive logical sum of the data blocks in each HDD corresponding to each other into another HDD as parity block (parity data) and of distributing the parity block to the whole HDDs.

FIG. 1 shows one exemplary structure of the conventional AV server system (the system means one in which a plurality of units are collected logically and it does not matter whether the respective units are stored in one case or not) using the RAID technology.

This AV server system comprises a multi-channel AV server 100 which is capable of providing multi-input/output of a plurality of image data (audio data will be included in image data as necessary hereinafter) and may be utilized as a system for broadcasting CMs (commercial) and news.

The multi-channel AV server 100 comprises a plurality of disk array units 1101 through 1104 for recording input image data and a processor 120. It is noted that the processor 120 is configured so as to control the input of the image data to be recorded in the disk array units 1101 through 1104 and to control the output of the image data reproduced from the disk array units 1101 through 1104.

Then, the multi-channel AV server 100 records respective ones of a plurality of input image data DI1 through IN (N is an integer value greater than 2) inputted from a VTR 121 for reproducing images and a parabola antenna 122 for receiving data via a satellite line at least in one of the disk array units 1101 through 1104. The multi-channel AV server 100 also reproduces data recorded in the disk array units 1101 through 1104 as necessary and outputs as output data Do1 through NoN to the monitor 123 and the parabola antenna 124 for example.

FIG. 2 shows one exemplary structure of the disk array unit 110i (here, i=1, 2, 3 and 4) in FIG. 1.

The disk array unit 110i comprises a plurality of, e.g., five, HDDs 1311 through 1315 and a disk array controller 130 for controlling those 13115. In the disk array unit 110i, data is read/written from/to the HDDs 1311 through 1315 per predetermined unit (in unit of one frame or one GOP (Group of Picture) for example). While the mode for writing/reading data to/from the plurality of HDDs is the mode called RAID-0, one out of the plurality of HDDs is used for recording the parity data and the remaining HDDs are used for recording the image data in the RAID-3 for example.

It is noted that although the five HDDs 1311 through 1315 are shown in FIG. 2, the number of HDDs composing the disk array unit 110i is not limited to that number.

Data of one frame is divided in unit of one byte for example in the 130 in the disk array unit 110i and the divided data is written to the HDDs 1311 through 1315 in parallel. The 110i also reproduces data recorded in the HDDs 1311 through 1315 and outputs the reproduced respective data by multiplexing into the same condition with that at the time of input.

Here, first frame data F1 and second frame data F2 are written to the HDDs 1311 through 1315 in parallel in FIG. 2.

It is noted that in order to reduce the influence of seek (retrieving operation) time of data in the HDDs. 1311 through 1315, image data is written/read in a certain degree of lump, e.g., several tens frames) at one time of access.

By the way, it is required to reproduce the recorded data at variable speed in structuring an editing system for example by using the multi-channel AV server 100 as described above. That is, the variable speed reproduction is often used in editing works and the like because it is convenient in finding a specific scene for example.

As a method for implementing the variable-speed reproduction in the multi-channel AV server 100, there has been one of reading image data by culling frames in correspondence to it reproducing speed. However, setting aside the case of the RAID-5 in which image data of one frame is recorded in one HDD in reading image data by culling the frames, there has been a case in which image data necessary for variable-speed reproduction of desired speed cannot be read in the RAID-0 and RAID-3 in which image data of one frame is recorded across the plurality of HDDS.

That is, because image data has been recorded into the plurality of HDDs without controlling the recording pattern specifically in the past, the image data of one frame is distributed into the plurality of HDDs and is-recorded in parallel in the order of line scan (in the order of coding in case when image data is coded) in RAID-0 and RAID-3. Accordingly, although the continuous frames may be reproduced by seeking image data of the first frame and then by reading the image data continuously in each HDD, image data of certain frame must be sought every time when the image data of frame to be read changes in each HDD in reproducing sporadic frames. Because it takes about 10 to 20 mil-seconds in seeking data in the HDD, the performance would be about 3 frames/100 msec for example as data reading speed when data must be sought every time when image data of a frame to be read changes. As a result, the multi-channel AV server 100 whose basic function is multi-accessing can output data only by the performance of several frames/sec and it becomes difficult to read data of 30 frames/sec which is normally required.

Further, a fall of original image (so-called missing frame) occurs in a reproduced image when image data is read by culling frames.

That is, while jumped data of frames F1, F3, F5, F7, F9, . . . is read in reproducing continuous image data of frames F1, F2, F3, . . . at double speed, the frames F2, F4, F6, F8, . . . fall in the reproduced image. While the data of the frames F1, F5, F9, . . . is outputted in reproducing the image at quadruple-speed, the more original images fall as compared to the case of double-speed reproduction. The fall of the image increases as the reproducing speed increases.

Because the variable-speed reproduction is used often in seeking a specific scene in editing works as described above, it becomes difficult to find a frame representing an instant image like a frame showing a scene of lighting a flashbulb when the fall of frames occurs in reproducing at variable speed, thus affecting the editing works.

Then, the applicant of the present invention has proposed a method of minimizing the fall of frames and of shortening the seek time by recording image data to a plurality of HDDs while controlling its recording pattern and by reading image data for, so to speak, each reproducing speed corresponding to the reproducing speed of the variable-speed reproduction from the plurality of HDDs in Japanese Patent Application No. Hei. 10-122535 for example.

By the way, according to the method proposed in Patent Application No. Hei. 10-122535, the image data of the reproducing speed is read from the HDDs corresponding to the reproducing speed of the variable-speed reproduction, so that when a control is made so as to change the reproducing speed, that image data for the reproducing speed after the change must be read from the HDD.

However, the multi-channel AV server is configured so as to periodically assign a time accessible to a plurality of disk array units (hereinbelow, called as a time slot as necessary) to each channel in general and each channel is allowed to access to the disk array unit in the time slot assigned to it (hereinbelow, called as own time slot as necessary). Then, because the time slot is given to each channel periodically as described above, the more the number of channels, the longer the interval by which each channel can access to the disk array unit, i.e., the time until when accessing to the next disk array unit after accessing the disk array unit (hereinbelow called as a time slot period) becomes.

When the number of channels increases the time slot period is prolonged as described above. Accordingly, when a control is made so as to change the reproducing speed, it takes time to read the image data for reproducing speed corresponding to that control and as a result, a considerable time-lag occurs until when the reproducing speed changes actually from when the control has been made. The slow reaction of the unit to the control causes the user to feel that the controllability is bad and as a result, it drops the efficiency of the editing works.

SUMMARY OF THE INVENTION

The present invention has been made in view of the above-mentioned circumstances and improves the controllability in reproducing image data.

According to the invention, an image reproducing apparatus comprises reading means for reading divisional data of part corresponding to requested reproducing speed from a plurality of groups of recording media when a reproduction of images is requested; storage means for storing the divisional data read from the plurality of groups of recording media; structuring means for structuring the reproduced image by reading and using the divisional data stored in the storage means; and control means for controlling a reading pattern of the divisional data from the storage means.

According to the invention, an image reproducing method comprises a reading step for reading divisional data of part corresponding to requested reproducing speed from a plurality of groups of recording media when a reproduction of images is requested; a storing step for storing the divisional data read from the plurality of groups of recording media; a structuring step for structuring the reproduced image by reading and using the divisional data stored in the storage means; and a controlling step for controlling a reading pattern of the divisional data from the storage means.

According to the image reproducing apparatus and the image reproducing method constructed as described above, the divisional data of the part corresponding to the requested reproducing speed is read from the respective ones of the plurality of groups of recording media and is stored in the storage means when the reproduction of image is requested. The reproduced image is structured by reading the divisional data stored in the storage means and by using the divisional data. In such case, the divisional data reading pattern from the storage means is controlled.

The specific nature of the invention, as well as other objects, uses and advantages thereof, will clearly appear from the following description and from the accompanying drawings.

BRIEF DESCRIPTION OF THE DRAWINGS

FIGS. 5A through 5C are diagrams for explaining methods for grouping one frame of image;

FIGS. 6A through 6C are diagrams showing a format of data on a down data bus;

FIG. 7 is a block diagram showing one exemplary structure of disk array units in FIG. 3;

FIG. 8 is a chart showing divisional data recorded respectively in HDDs;

FIG. 9 is a chart showing patterns in reading divisional data from the HDDs in reproducing by single-speed;

FIG. 10 is a chart showing patterns in reading divisional data from an image temporary storage section in reproducing by single-speed;

FIG. 11 is a chart showing patterns in reading divisional data from the HDDs in reproducing by double-speed;

FIG. 12 is a chart showing patterns in reading divisional data from the image temporary storage section in reproducing by single-speed;

FIG. 13 is a chart showing patterns in reading divisional data from the HDDs in reproducing by quadruple-speed;

FIG. 14 is a chart showing patterns in reading divisional data from the image temporary storage section in reproducing by quadruple-speed;

FIGS. 15A and 15B are charts showing divisional data reading patterns from the image temporary storage section in carrying out pseudo single-speed reproduction or double-speed reproduction by using divisional data for quadruple-speed reproduction;

DESCRIPTION OF THE PREFERRED EMBODIMENTS

Figure 3:
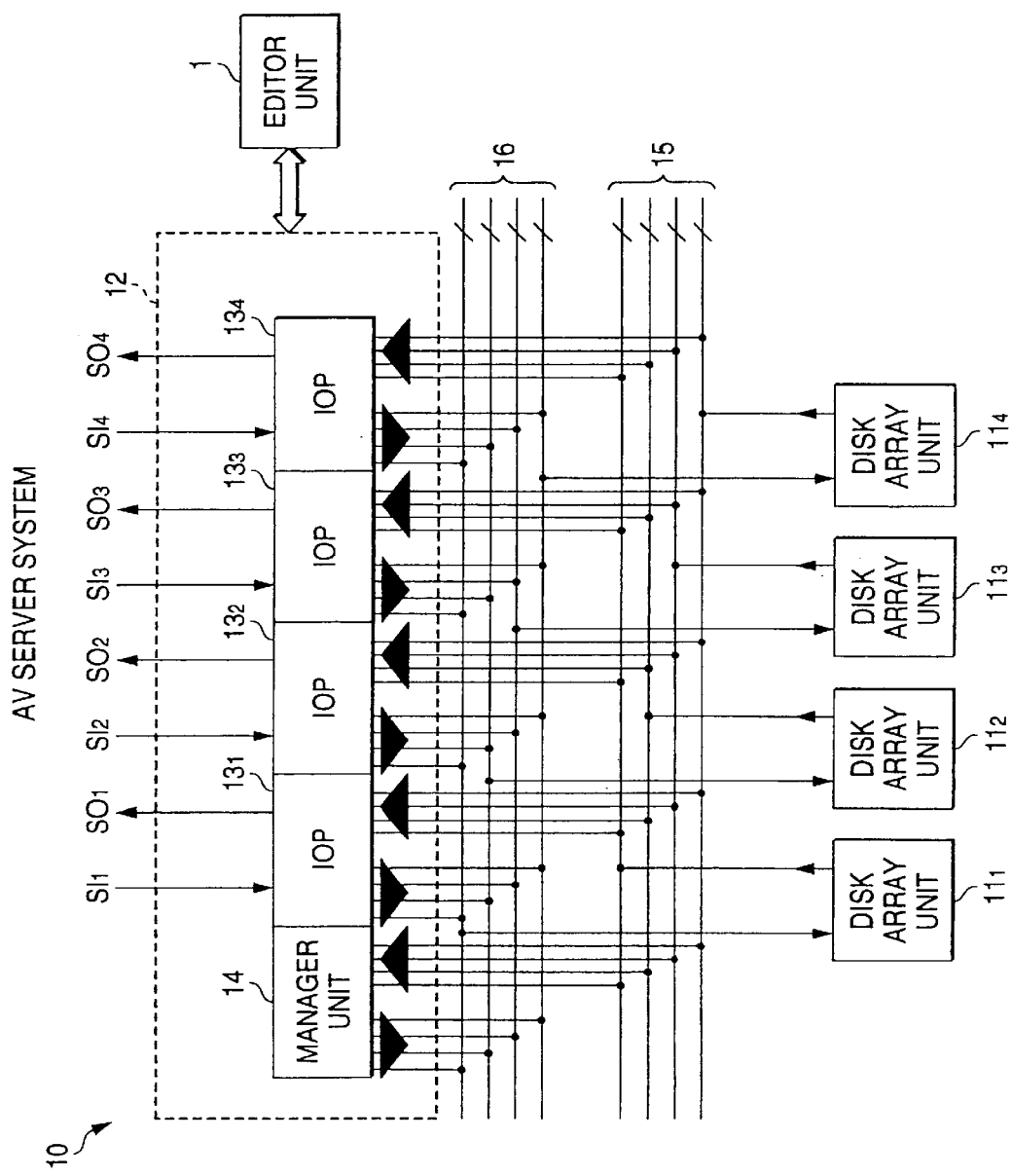
FIG. 3 is a block diagram showing one exemplary structure of one embodiment of an AV server system to which the present invention is applied.

FIG. 3 shows an exemplary structure of one embodiment of an AV server system to which the present invention is applied.

This AV server system is composed of an editor unit 1 and an AV server 10 so as to be able to be used as an editing system of news and other programs.

The editor unit 1 is constructed, for example, based on personal computers and workstations and is arranged so as to output input/output signals for giving various instructions such as recording, reproduction and edition of image data to the AV server 10 in accordance to the manipulation of the user. In concrete, the editor unit 1 has, for example, a jog dial or a shuttle ring to allow the user to instruct image reproducing speed by manipulating them.

The AV server 10 is constructed as a multi-channel AV server which is capable of inputting/outputting a plurality of image data in multi and comprises a plurality of, e.g., four, disk array units 111 through 114 having the RAID structure (RAID-0, RAID-3 and the like for example), an input/output processor section 12 for inputting data to be recorded in the disk array units 111 through 114 and for outputting data read from the disk array units 111 through 114 and an up data bus 15 and a down data bus 16 for exchanging data between the disk array units 111 through 114 and the input/output processor section 12.

Although the four disk array units 111 through 114 are provided as the disk array units in the embodiment shown in FIG. 3, the number of the disk array units composing the AV server 10 is not limited to be four.

The disk array units 111 through 114 are composed of a plurality of HDDs as described later and are arranged so as to record image data supplied from the input/output processor section 12 via the down data bus 16 or to read image data recorded therein to supply to the input/output processor section 12 via the up data bus 15.

The input/output processor section 12 comprises a plurality of, e.g., four, input/output processor units (hereinafter referred to as IOP (Input/Output Processor) as necessary) 131 through 134 and a manager unit 14.

The IOPs 131 through 134 are configured so as to execute accesses for recording/reproducing data to/from the disk array units 111 through 114 in time-division manner in unit of time slot which is a temporal delimiter obtained by dividing a certain time interval (time slot period) into a plurality of periods. That is, the IOPs 131 through 134 execute the control for recording image data to the disk array units 111 through 114 and for reproducing image data recorded therein in the time slot assigned to each. The manager unit 14 controls accessing rights to the disk array units 111 through 114 by assigning the time slot periodically to the IOPs 131 through 134.

Here, according to the embodiment in FIG. 3, the four IOPs 131 through 134 are provided as the IOPs for recording/reproducing image data to/from the disk array units 111 through 114 and therefore, the AV server 10 in FIG. 3 composes a multi-channel AV server of four channels.

It is noted that the number of IOPs composing the AV server 10 is not limited to be four. Further, although the number of the IOPs and that of the disk array units are the same, i.e., four in the embodiment of FIG. 3, the numbers of the IOPs and the disk array units may be different (there is no relationship of dependence between the number of the IOPs and that of the disk array units).

The up data bus 15 and the down data bus 16 connect the respective ones of the disk array units 111 through 114 and the respective ones of the IOPs 131 through 134 or the manager unit 14. Then, the up data bus 15 and the down data bus 16 are both provided by the same number with that of the disk array units 111 through 114, i.e., four, in the embodiment of FIG. 3. One up data bus 15 and one down data bus 16 connect one disk array unit 11i (i is an arbitrary integer value from 1 through 4) with the IOPs 131 through 134 or the manager unit 14, respectively. Accordingly, the IOP 13j (j is an arbitrary integer value from 1 through 4) can access to each of the disk array units 111 through 114 in the same time (in parallel).

It is noted that the transfer of data from the disk array units 111 through 114 to the input/output processor section 12 is carried out via the up data bus 15 and the transfer of data from the input/output processor section 12 to the disk array units 111 through 114 is carried out via the down data bus 16.

When the editor unit 1 is manipulated so as to record image data and accordingly, image data SIj to be recorded is supplied to the IOP 13j in the AV server system constructed as described above, the IOP 13j converts the image data SIj into a predetermined format and transmits to the respective disk array units 111 through 114 via the down data bus 16 together with a command (write command) instructing to record. Here, the IOP 13j carries out data conversion as a process for taking out image data from data inputted thereto in the transmitting formats of SDI (Serial Digital Interface: standardized as SMPTE-259M) and SDTI (Serial Digital Transfer Interface: standardized as SMPTE-305M), data conversion such as compression (MPEG for example) utilizing the correlation among frames and intra-frame compression (DV for example).

Receiving the image data and the write command from the IOP 13j via the down data bus 16, the disk array units 111 through 114 divide the image data in unit of one byte, generate parity data and record the data in unit of one byte and the parity data in a plurality of HDDs contained therein in accordance to the write command.

Meanwhile, when the editor unit 1 is manipulated so as to reproduce image data, the IOP 13j transmits a read command instructing to read data to the disk array units 111 through 114 via the down data bus 16. Receiving the read command from the IOP 13j, the disk array units 111 through 114 control the plurality of HDDs in accordance to the read command to read the image data and the parity data and carries out an error correcting process to the image data by using the parity data as necessary. The respective disk array units 111 through 114 also multiplex the image data after the error correcting process to output to the IOP 13j via the up data bus 15. The IOP 13j converts the image data transferred via the up data bus 15 into the image data of the original format to output to the outside.

Figure 4:
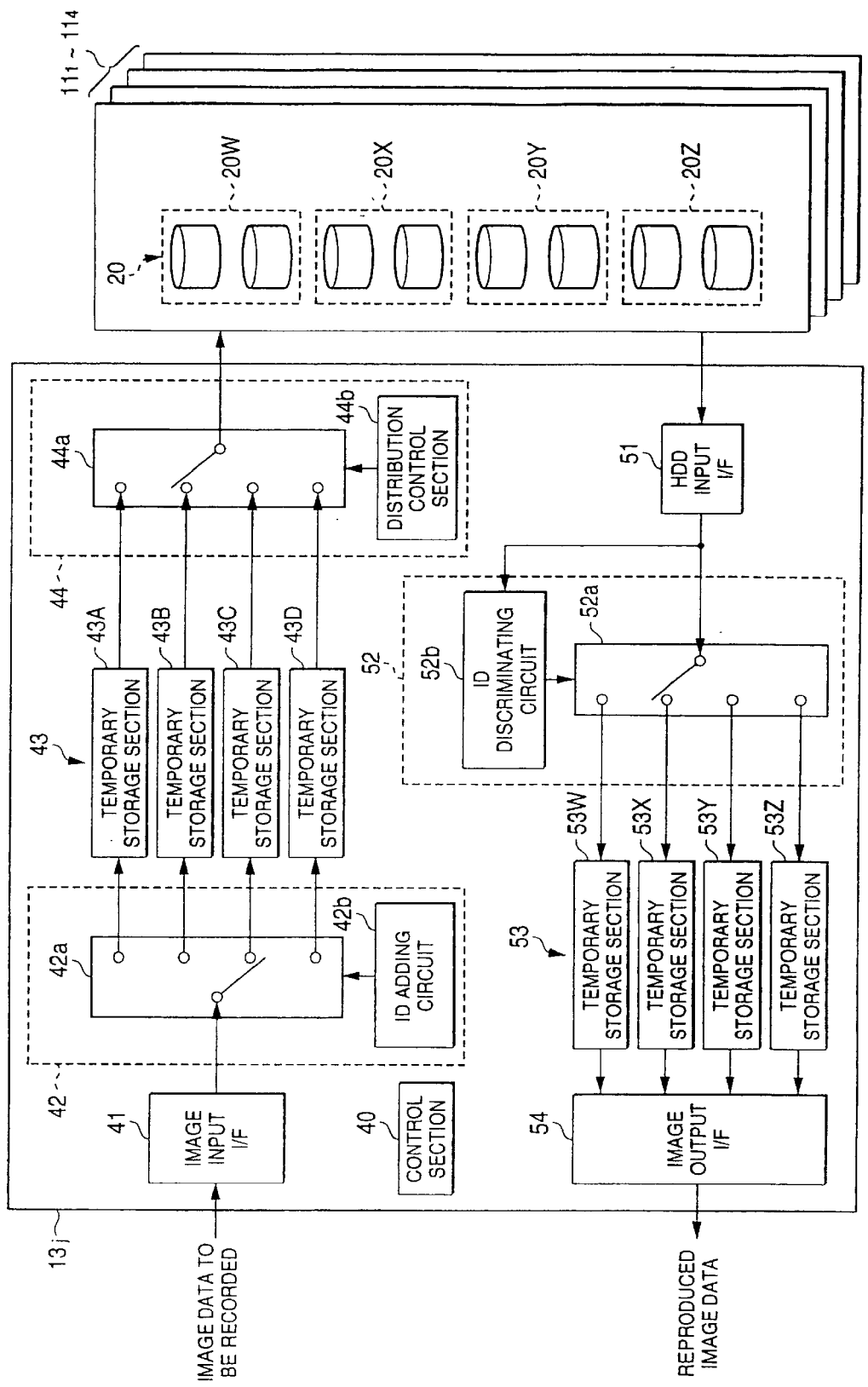
FIG. 4 is a block diagram showing one exemplary structure of IOPs in FIG. 3.

FIG. 4 shows one exemplary structure of the IOP 13j in FIG. 3. It is noted that the up data bus 15 and the down data bus 16 are omitted in FIG. 4.

The IOP 13j has a controller section 40 for controlling each block. The IOP 13j also has an image input I/F (Interface) 41, an image group dividing section 42, an image data temporary storage section 43 and an HDD output I/F 44 as a block of a recording system for carrying out processes for recording image data. The IOP 13j also has an HDD input I/F 51, an image group detecting section 52, an image data temporary storage section 53 and an image output I/F 54 as a block of a reproducing system for carrying out processes for reproducing image data.

The image input I/F 41 the image data SIj inputted to the IOP 13j into the predetermined format described above and supplies it to the image group dividing section 42.

The image group dividing section 42 divides the image data outputted from the image input I/F 41 into a plurality of divisional data per one frame for example and categorizes the respective divisional data into a plurality of groups, e.g., four groups of group A through D, to supply to the image data temporary storage section 43. That is, the image group dividing section 42 comprises a switch 42a for dividing the image data from the image input I/F 41 into the divisional data of the four groups A through D per one frame and for selectively switching and outputting the grouped divisional data to the temporary storage sections 43A through 43D per group, e.g., in unit of one byte, and an ID adding circuit 42b for adding group ID (identification information) which is group information indicative of which group a divisional data belongs at the head of the divisional data per one frame.

The image data temporary storage section 43 temporarily stores the divisional data of the four groups from the image group dividing section 42 with at least only in predetermined image unit, e.g., of 16 frames, per each group. That is, the image data temporary storage section 43 has temporary storage sections 43A through 43D for each group for storing the divisional data of the groups A through D, respectively.

The HDD output I/F 44 distributes the divisional data of each group temporarily stored in the image data temporary storage section 43 to the disk array units 111 through 114 to record therein. That is, the HDD output I/F 44 has a switch 44a for selectively switching the connection to the temporary storage sections 43A through 43D to selectively obtain the divisional data of the groups A through D stored respectively in the temporary storage sections 43A through 43D and a distribution control section 44b for controlling the switching of the connection of the switch 44a to distribute the divisional data obtained from the temporary storage section 43A through 43D to the disk array units 111 through 114.

The HDD input I/F 51 reads the divisional data from the respective ones of the disk array units 111 through 114 and outputs the read divisional data to the image group detecting section 52 with predetermined image unit, e.g., of 16 frames.

The image group detecting section 52 detects the group information of the divisional data outputted from the HDD input I/F 51 (to detect to which group the divisional data belongs) and categorizes the divisional data based on the group information to supply to the image data temporary storage section 53. That is, the image group detecting section 52 has a switch 52a for selectively switching and outputting the divisional data outputted from the HDD input I/F 51 to the temporary storage sections 53W through 53Z and an ID discriminating circuit 52b for discriminating the group ID which is the group information of the divisional data and for controlling the switching of the connection of the switch 52a based on the group ID. It is noted that the group ID is added in recording image data in the image group dividing section 42 as described above.

The image data temporary storage section 53 temporarily stores the divisional data outputted from the image group detecting section 52. That is, the image data temporary storage section 53 has temporary storage sections 53W through 53Z for each group for storing the divisional data read out from the HDDs 20W, 20X, 20Y and 20Z of four groups W, X, Y and Z described later of the disk array units 111 through 114 per group of the HDDS. It is noted that the group of the divisional data and the group of the HDD in which the divisional data is recorded change at certain period and accordingly, it is possible to recognize to which HDD the divisional data has been recorded from the group of that divisional data.

The image output I/F 54 reads the divisional data temporarily stored in the image data temporary storage section 53 and implements a predetermined process such as decoding as necessary. Then, it structures image data of one frame (reproduced image data) to output to the outside.

It is noted that the controller section 40 controls the storage areas of the divisional data in the temporary storage sections 53W through 53Z corresponding to reproducing speed specified through the manipulation of the editor unit 1 or controls from which area of the storage areas in the temporary storage sections 53W through 53Z the data should be read (data reading pattern) corresponding to the reproducing speed.

The image data temporary storage sections 43 and the image data temporary storage section 53 are constructed by SDRAMs (Synchronous Dynamic Random Access Memory) and the like and are composed of a plurality of banks. That is, the temporary storage sections 43 and 53 are both composed of three banks for example and thereby, data storage and reading operations may be carried out in the same time by switching the banks. Here, although theoretically two banks would be enough to store and read data in the same time, the bank switching timing restricted and it becomes difficult to design by the two-bank structure. Thereby, the storage section is composed of three banks here.

FIG. 5 shows the method for dividing an image of one frame carried out by the image group dividing section 42 in FIG. 4.

An image of one frame may be divided into divisional data of four groups A through D by dividing into four equal parts in the horizontal direction as shown in FIG. 5A or may be divided into the four groups A through D by dividing into two equal parts respectively in the vertical and horizontal directions as shown in FIG. 5B. Or an image of one frame may be divided into 20 divisional data in total by dividing into four equal parts in the vertical direction and by dividing into five equal parts in the horizontal direction to group each divisional data into four groups A through D cyclically as shown in FIG. 5C. It is noted that the method for dividing an image is not limited only those shown in FIGS. 5A through 5C. Further, although the divisional data obtained by dividing an image of one frame is grouped into four groups A through D in the present embodiment, the number of groups is not also limited to be four.

FIGS. 6A through 6C show a format of data on the down data bus 16 transferred from the input/output processor section 12 to the disk array units 111 through 114.

The time slot is assigned periodically to the IOPs 131 through 134 as described above and the HDD output I/F 44 of the IOPs 131 through 134 outputs the data of the channels CH1 through CH4 in own time slot. Accordingly, the data on the down data bus 16 is what the data of the channels CH1 through CH4 is aligned periodically as shown in FIG. 6A.

The respective data of the channels CH1 through CH4 are composed of a header section, a command section and a data area disposed sequentially from the head thereof as shown in FIG. 6B.

A bit string or the like indicative of that it is the head of the data is disposed at the header section. A command for controlling the disk array unit 11i is disposed in the command section. In the data area, sets of a group ID (GPID (Group Identifier)) and divisional data of one frame are disposed repeatedly by predetermined unit of images, e.g., unit of 16 frames.

Here, at least image data of number of frames equal to a multiplied value of the total number of channels and a number of frames normally reproduced within a time slot is disposed in the data area of each channel in order to be able to reproduce normally on real-time (single-speed reproduction). Accordingly, when the number of channels is four and the time slot is the time for four frames for example, image data of at least 16 (=4×4) frames is disposed in the data area of each channel. That is, because it takes a time of the multiplied value of the total number of channels and the time slot until when the next time slot is assigned from when a time slot has been assigned in each channel, the data required until when the next time slot is assigned must be processed in the previous time slot in order to reproduce images on real-time. As the group ID, identifier names (A, B, C and D in the present embodiment) for discriminating the group to which the divisional data belongs are described in the order corresponding to the order of array of the divisional data of one frame which follows as shown in FIG. 6C. Accordingly, it is possible to discriminate the group of the divisional data of one frame which follows by making reference to the group ID.

Then, the divisional data of each group of one frame is disposed repeatedly in the order of group ruled by the group ID in unit of one byte for example. That is, because the group ID after the command section in FIG. 6 are A, B, C and D, the respective ones of divisional data of one frame belonging to the groups A, B, C and D are disposed periodically in unit of one byte after the group ID. Further, because the group IDs after that are B, C, D and A, the respective ones of divisional data of the next one frame belonging to the groups B, C, D and A are disposed periodically in unit of one byte after the group ID.

It is noted that the distribution control section 44b composing the HDD output I/F 44 in FIG. 4 is arranged so as to control the switching of the connection of the switch 44a and thereby to obtain the divisional data stored in the temporary storage sections 43A through 43D selectively by one byte each per group to construct the data structure shown in FIG. 6 and to output the data to the disk array units 111 through 114.

The order of array of the divisional data of each group is changed per frame and the divisional data of the first frame is disposed repeatedly in the order of groups A, B, C and D and the divisional data of the second frame is disposed repeatedly in the order of groups B, C, D and A as described above. Thereafter, the order (pattern) of the array of the divisional data of each group is changed in the same manner and the data is cycled per four frames here.

Figure 1:
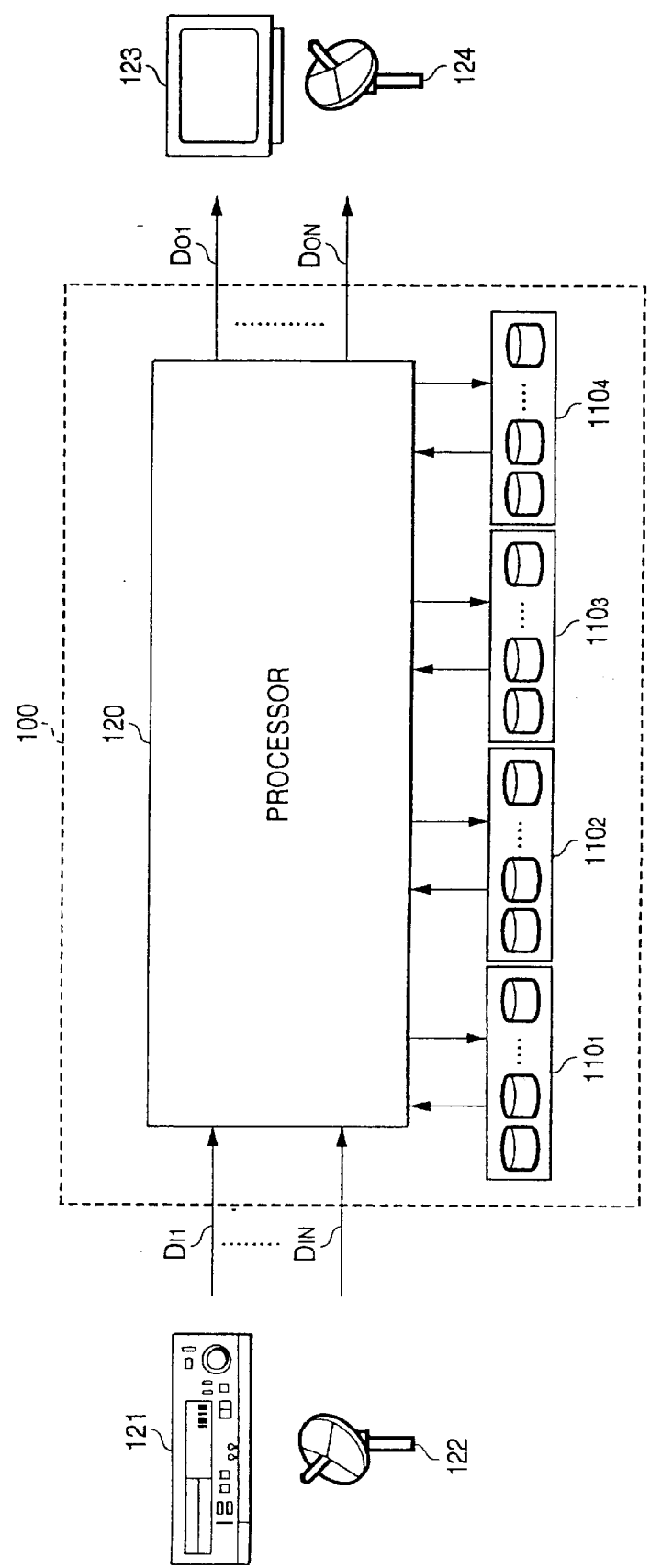
FIG. 1 is a block diagram showing one exemplary structure of a conventional AV server system.
Figure 2:
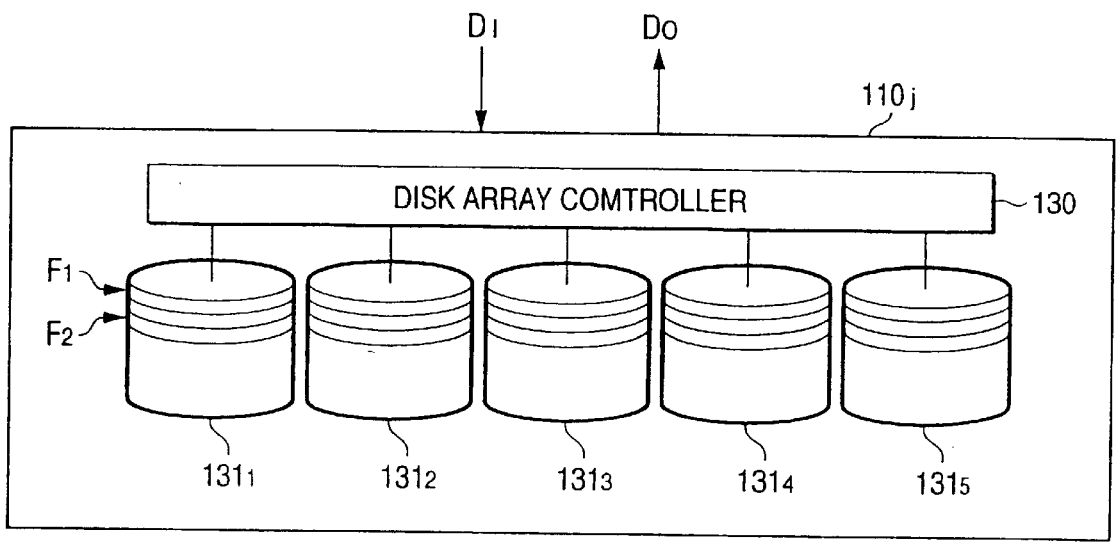
FIG. 2 is a block diagram showing one exemplary structure of disk array units in FIG. 1.

FIG. 7 shows one exemplary structure of the disk array unit 11i of FIG. 1.

The disk array unit 11i comprises a plurality of, e.g., eight, HDDs 20 (20W1, 20W2, 20X1, 20X2, 20Y1, 20Y2, 20Z1 and 20Z2) and a disk array controller 30. Data is written/read in parallel in each of the plurality of HDDs 20.

Here, while image data is written/read in parallel in each of the plurality of HDDs in case of the RAID-0, one out of the plurality of HDDs is used specifically for parity data and the remaining HDDs are used for writing/reading image data in case of RAID-3. It is noted the RAID-3 will be adopted in the present embodiment. However, the HDD for recording the parity data is omitted in FIG. 7. Although the eight HDDs are shown in FIG. 7 as the HDDs for recording image data, the number of HDDs is not limited to that number.

The eight HDDs 20 to which the image data is recorded is divided into same four groups W, X, Y and Z corresponding to the number of groups of the divisional data.

Here, among the eight HDDs 20W1, 20W2, 20X1, 20X2, 20Y1, 20Y2, 20Z1 and 20Z2, the HDDs 20W1 and 20W2 are grouped into the group W, the HDDs 20X1 and 20X2 are grouped into the group X, the HDDs 20Y1 and 20Y2 are grouped into the group Y, and the HDDs 20Z1 and 20Z2 are grouped into the group Z, respectively, according to the embodiment shown in FIG. 7.

The eight HDDs 20 of the four disk array units 111 through 114 are also divided into the groups as described above. The HDDs belonging respectively to the groups W, X, Y and Z will be represented altogether as HDDs 20W, 20X, 20Y and 20Z hereinbelow as necessary.

The disk array controller 30 comprises a data distributor 31 and four switches 32W, 32X, 32Y and 32Z, i.e., the same number with the number of the groups of HDDs (accordingly, the number of groups of divisional data).

The data distributor 31 selectively outputs the data DI to be recorded from the IOP 13j to the switches 32W, 32X, 32Y and 32Z in unit of one byte for example. The data distributor 31 also obtains data selectively from the switches 32W, 32X, 32Y and 32Z in unit of one byte for example and multiplexes the obtained data to output as data DO to the IOP 13j.

The switch 32 distributes the data from the IOP 13j selectively to the two HDDs 20W1 and 20W2 in the group W. The switch 32 also obtains data read from the two HDDs 20W1 and 20W2 of the group W selectively in unit of one byte for example. It is noted that the other switches 32X, 32Y and 32Z also process the data from the data distributor 31 to supply to the HDDs 20X, 20Y and 20Z of the groups X, Y and Z and supply the data read from the HDDs 20X, 20Y and 20Z to the data distributor 31 in the same manner with the switch 32W.

FIG. 8 shows the relationship between the HDDs 20W, 20X, 20Y and 20Z of the groups W, X, Y and Z and the groups A, B, C and D of the divisional data recorded to those HDDs 20W, 20X, 20Y and 20Z.

In FIG. 8 (the same applies to FIGS. 9, 11 and 13 described later), the left column, the second column from the left, the third column from the left and the right column show the divisional data recorded in the HDDs 20W, 20X, 20Y and 20Z of the groups W, X, Y and Z, respectively.

The combination of numeral, hyphen (-), alphabet M and either one of alphabets A through D in each column in FIG. 8 (the same applies to FIGS. 9, 11 and 13 described later) represents the divisional data. That is, the first numeral represents a frame of the divisional data (to which frame the divisional data belongs) and the last alphabet represents the group of the divisional data. Accordingly, in FIG. 8, the divisional data 1-MA at the upper left column, for example, represents divisional data in the group A of the first frame where the divisional data 64-MC at the lower right column, for example, represents divisional data in the group C of the 64th frame.

As it is apparent from FIG. 8, the divisional data is recorded to the HDDs 20W through 20Z so that the relationship between the groups W through Z of the HDDs 20W through 20Z and the groups A through D of the data recorded to those HDDs 20W through 20Z changes periodically with a certain pattern. That is, in FIG. 8, the divisional data is recorded to the HDDs 20W through 20Z of the groups W through Z so that the groups A through D of the divisional data cycle with the period of four frames.

It is noted that such cyclic data recording may be realized by recording the data stream of the divisional data as shown in FIG. 6 and outputted by the IOP 13j to the HDDs 20W through 20Z sequentially while distributing to each in unit of one byte for example by the data distributor 31 of the disk array units 111 through 114.

Although only the image data (divisional data) of the first through 64th frames are shown in FIG. 8 (the same applies also to FIGS. 9, 11 and 13), image data of the 65th frame and thereafter is recorded to the HDDs 20W through 20Z in the same manner.

The image data (divisional data) recorded to the HDDs 20W through 20Z as shown in FIG. 8 may be read when the user requests to reproduce the image by manipulating the editor unit 1 corresponding to the reproducing speed of the request.

FIG. 9 shows the image data read respectively from the HDDs 20W through 20Z when the user requests to reproduce at the normal speed (single-speed reproduction).

It is assumed here that real-time reproduction at the single-speed is possible and the AV server 10 has such capability by reading image data of 16 frames in one time slot from the relationship between the number of channels (the number of IOPs composing the AV server 10) and the length (time) of the time slot described above and an amount of data to be processed in one time slot.

Accordingly, in case of the single-speed reproduction, the divisional data of 16 frames in the part surrounded by thick lines in FIG. 9 (original image data of the first through 16th frames) is read out of the HDDs 20W through 20Z in the own time slot n of the IOP 13j. In the next own time slot n+1, divisional data of 16 frames (original image data of the 17th through 32nd frames) which are recorded after the divisional data 16 frames read in the own time slot n is read out of the HDDs 20W through 20Z. Thereafter, the divisional data is read in unit of 16 frames in the own time slot in the same manner. Accordingly, because the image data of four frames recorded in the continuous areas is all read respectively out of the HDDs 20W through 20Z in one time slot in this case, no seek problem occurs due to the change of the frames of the image data to be read.

The divisional data of 16 frames read from the HDDs 20W through 20Z is supplied to the IOP 13j from the disk array controller 30 (FIG. 7). The IOP 13j (FIG. 4) receives the divisional data of 16 frames by the HDD input I/F 51 to supply to the image group detecting section 52. The image group detecting section 52 samples the divisional data stored in the HDDs 20W through 20Z and supplies them to the temporary storage sections 53W through 53Z to store therein, respectively.

FIG. 10 shows the divisional data stored in the temporary storage sections 53W through 53Z in case of single-speed reproduction.

It is noted that in FIG. 10 (the same applies to FIGS. 12, 14 and 15 described later), the left most column, the second column from the left, the third column from the left and the right most column show the divisional data stored in the temporary storage sections 53W through 53Z, respectively.

The divisional data stored in the HDDs 20W through 20Z among the divisional data of 16 frames read in the time slot n in FIG. 9 is stored temporarily to the temporary storage sections 53W through 53Z, respectively, as shown in FIG. 10.

Then, the image output I/F 54 reads the divisional data out of the temporary storage sections 53W through 53Z with the pattern corresponding to the reproducing speed to structure a reproduced image by using the read divisional data.

That is, in case of the single-speed reproduction, the image output I/F 54 reads the four divisional data as surrounded by thick lines in FIG. 10 as indicated by an arrow as a reproduced image of one frame.

In this case, the four divisional data read by the image output I/F 54 as the reproduced image of one frame contain one each of the divisional data of the groups A through D and the image output I/F 54 disposes the respective divisional data of the groups A through D at the position corresponding to each group of the frame to structure the reproduced image of one frame. That is, when the image of one frame is divided by the image group dividing section 42 (FIG. 4) into the divisional data of the groups A B, C and D in order from the top as shown in FIG. 5A for example, the image output I/F 54 structures the reproduced image of one frame by disposing the divisional data of the groups A through D in order from the top of the frame.

Accordingly, in case shown in FIG. 10, the divisional data 1-MA, 1-MB, 1-MC and 1-MD of the groups A, B, C and D of the first frame of the original image are read At first and the reproduced image of the first frame is structured by disposing them from the top of the frame in the order of the groups A, B, C and D. Then, the divisional data 2-MA, 2-MB, 2-MC and 2-MD of the groups A, B, C and D of the second frame of the original image are read and the reproduced image of the second frame is structured by disposing them from the top of the frame in the order of the groups A, B, C and D. The reproduced images of the third frame and thereafter are also structured in the same manner.

That is, in case of the single-speed reproduction, the same (similar) image with the original image is structured as the reproduced image.

It is noted that the controller section 40 controls the operation of the image output I/F 54 for reading the divisional data in the pattern corresponding to the reproducing speed.

FIG. 11 shows image data read out of the HDDs 20W through 20Z when the user requests to reproduce images at double-speed.

Because image data of 16 frames must be read in one time slot in case of the single-speed reproduction as described above, image data of 32 frames must be read simply in case of the double-speed reproduction. However, because the AV server 10 has the capability of reading image data of only 16 frames in one time slot as described above, it cannot read image data of 32 frames.

Accordingly, in case of the double-speed reproduction, the divisional data of 16 frames in the part surrounded by thick lines in FIG. 11 in the image data of 32 frames (the first through 32nd frames) is read out of the HDDs 20W through 20Z in the own time slot n of the IOP 13j.

That is, in this case, the frames of the divisional data read out of the HDDs 20W and 20Y are different from those read out of the HDDS 20X and 20Z. For instance, the divisional data of the first through 16th frames is read out of the HDDS 20W and 20Y and the divisional data of the 17th to 32nd frames is read out of the HDDS 20X and 20Z.

Then, in the next own time slot n+1, divisional data of 16 frames in the same pattern with the case of the own time slot n in the image data of the next 32 frames (the 32nd through 64th frames) is read out of the HDDs 20W through 20Z. Thereafter, the divisional data is read in unit of 16 frames in the own time slot thereafter in the same manner.

Accordingly, because the image data of four frames is read out of the continuous areas respectively out of the HDDs 20W through 20Z in one time slot also in this case, no seek problem occurs due to the change of the frames of the image data to be read.

The divisional data of 16 frames read out of the HDDs 20W through 20Z is supplied to the IOP 13j and is stored in the temporary storage sections 53W through 53Z in the same manner with the case of the single-speed reproduction.

FIG. 12 shows the divisional data stored in the temporary storage sections 53W through 53Z in case of double-speed reproduction.

The divisional data stored in the HDDs 20W through 20Z among the divisional data of 16 frames read in the time slot n in FIG. 11 is stored temporarily to the temporary storage sections 53W through 53Z, respectively, as shown in FIG. 12.

Then, the image output I/F 54 reads the divisional data out of the temporary storage sections 53W through 53Z with the pattern corresponding to the reproducing speed to structure a reproduced image by using the read divisional data.

That is, in case of the double-speed reproduction, the image output I/F 54 reads the four divisional data as surrounded by thick lines in FIG. 12 as indicated by an arrow as a reproduced image of one frame.

The four divisional data read by the image output I/F 54 as the reproduced image of one frame contain one each of the divisional data of the groups A through D and the image output I/F 54 disposes the respective divisional data of the groups A through D at the position corresponding to each group of the frame to structure the reproduced image of one frame also in this case. That is, when the image of one frame is divided by the image group dividing section 42 (FIG. 4) into the divisional data of the groups A, B, C and D in order from the top as shown in FIG. 5A for example, the image output I/F 54 structures the reproduced image of one frame by disposing the divisional data of the groups A through D in order from the top of the frame.

Accordingly, in the case shown in FIG. 12, the divisional data 1-MA and 1-MC of the groups A and C of the first frame of the original image and the divisional data 2-MB and 2-MD of the groups B and D of the first frame of the original image are read at first and the reproduced image of the first frame is structured by disposing them from the top of the frame in the order of the groups A, B, C and D. Then, the divisional data 3-MA and 3-MC of the groups A and C of the third frame of the original image and the divisional data 4-MB and 4-MD of the groups B and D of the fourth frame of the original image are read and the reproduced image of the second frame is structured by disposing them from the top of the frame in the order of the groups A, B, C and D. The reproduced images of the third frame and thereafter are also structured in the same manner.

That is, in case of the double-speed reproduction, the reproduced image of the fth frame is structured from the divisional data of the groups A and C of the second fth frame of the original image and the divisional data of the groups B and D of the second f+1 frame of the original image.

Accordingly, a half each of the image of two continuous frames of the original image is contained in the reproduced image of one frame reproduced at double-speed, so that no certain frames of the original image lack completely which otherwise occurs in the reproduced image of the conventional double-speed reproduction. As a result, it becomes possible to prevent the trouble which otherwise occurs in seeking a specific frame.

FIG. 13 shows image data read out of the HDDs 20W through 20Z when the user requests to reproduce at quadruple-speed.

Because image data of 16 frames must be read in one time slot in case of the single-speed reproduction as described above, image data of 64 frames must be read simply in case of the quadruple-speed reproduction. However, because the AV server 10 has the capability of reading image data of only 16 frames in one time slot as described above, it cannot read image data of 64 frames.

Accordingly, in case of the quadruple-speed reproduction, the divisional data of 16 frames in the part surrounded by thick lines in FIG. 13 in the image data of 64 frames (the first through 64th frames) is read out of the HDDs 20W through 20Z in the own time slot n of the IOP 13j.

That is, in this case, different frames of the divisional data read out of the HDDs 20W through 20Z, respectively. That is, for example, the divisional data of the first through 16th frames is read out of the HDD 20W, the divisional data of the 17th to 32nd frames is read out of the HDD 20X, the divisional data of the 33rd through 48th frames is read out of the HDD 20Y and the divisional data of the 49th to 64th frames is read out of the HDD 20Z, respectively.

Then, in the next own time slot n+1, divisional data of 16 frames in the same pattern with the case of the own time slot n in the image data of the next 64 frames (the 65th through 128th frames) is read out of the HDDs 20W through 20Z, respectively. Thereafter, the divisional data is read in unit of 16 frames in the own time slot thereafter in the same manner.

Accordingly, because the image data of four frames is read out of the continuous areas respectively out of the HDDs 20W through 20Z in one time slot also in this case, no seek problem occurs due to the change of the frames of the image data to be read.

The divisional data of 16 frames read out of the HDDs 20W through 20Z is supplied to the IOP 13*j* and is stored in the temporary storage sections 53W through 53Z in the same manner with the case of the single-speed reproduction.

FIG. 14 shows the divisional data stored in the temporary storage sections 53W through 53Z in case of quadruple-speed reproduction.

The divisional data stored in the HDDs 20W through 20Z among the divisional data of 16 frames read in the time slot n in FIG. 13 is stored temporarily to the temporary storage sections 53W through 53Z, respectively, as shown in FIG. 14.

Then, the image output I/F 54 reads the divisional data out of the temporary storage sections 53W through 53Z with the pattern corresponding to the reproducing speed to structure a reproduced image by using the read divisional data.

That is, in case of the quadruple-speed reproduction, the image output I/F 54 reads the four divisional data as surrounded by thick lines in FIG. 14 as indicated by an arrow as a reproduced image of one frame.

The four divisional data read by the image output I/F 54 as the reproduced image of one frame contain one each of the divisional data of the groups A through D and the image output I/F 54 disposes the respective divisional data of the groups A through D at the position corresponding to each group of the frame to structure the reproduced image of one frame also in this case. That is, when the image of one frame is divided by the image group dividing section 42 (FIG. 4) into the divisional data of the groups A, B, C and D in order from the top as shown in FIG. 5A for example, the image output I/F 54 structures the reproduced image of one frame by disposing the divisional data of the groups A through D in order from the top of the frame.

Accordingly, in the case shown in FIG. 14, the divisional data 1-MA of the group A of the first frame of the original image, the divisional data 2-MB of the group B of the second frame of the original image, the divisional data 3-MC of the group C of the third frame of the original image and the divisional data 4-MD of the group D of the fourth frame of the original image are read at first and the reproduced image of the first frame is structured by disposing them from the top of the frame in the order of the groups A, B, C and D. Then, the divisional data 5-MA of the group A of the fifth frame of the original image, the divisional data 6-MB of the group B of the sixth frame of the original image, the divisional data 7-MC of the group C of the seventh frame of the original image and the divisional data 8-MD of the group D of the eighth frame of the original image are read next and the reproduced image of the second frame is structured by disposing them from the top of the frame in the order of the groups A, B, C and D. The reproduced images of the third frame and thereafter are also structured in the same manner.

That is, in case of the quadruple-speed reproduction, the reproduced image of the fth frame is structured from the divisional data of the groups A of the fourth f frame of the original image, the divisional data of the group B of the fourth f+1 frame of the original image, the divisional data of the group C of the fourth f+2 frame of the original image and the divisional data of the group D of the fourth f+3 frame of the original image.

Accordingly, a quarter each of the image of four continuous frames of the original image is contained in the reproduced image of one frame reproduced at quadruple-speed, so that no certain frames of the original image lack completely which otherwise occurs in the reproduced image of the conventional quadruple-speed reproduction. As a result, it becomes possible to prevent the trouble which otherwise occurs in seeking a specific frame.

Next, assume a case when the user requests the double-speed reproduction by manipulating the editor unit 1 (FIG. 1) when the quadruple-speed reproduction is being carried out as described above for example. In this case, because the divisional data for the quadruple-speed reproduction shown in FIG. 14 read from the HDDs 20W through 20Z in the own time slot just before receiving the request of decelerating the reproducing speed from the quadruple-speed reproduction to the double-speed reproduction is stored in the temporary storage sections 53W through 53Z of the IOP 13*j*, the IOP 13*j* must abandon the divisional data for the quadruple-speed reproduction, read the divisional data for the double-speed reproduction as shown in FIG. 11 and store them in the temporary storage sections 53W through 53Z as shown in FIG. 12.

However, the IOP 13*j* of the AV server 10 cannot access to the HDDs 20W through 20Z basically until when the next own time slot is assigned. Even if it is assigned with a time slot of another channel exceptionally and can access to the HDDs 20W through 20Z, it can carry out not the double-speed reproduction but the quadruple-speed reproduction until when it stores the divisional data for the double-speed reproduction from the HDDs 20W through 20Z because the divisional data for the double-speed reproduction is not stored in the temporary storage sections 53W through 53Z.

Accordingly, when the double-speed reproduction is instructed while the quadruple-speed reproduction is being carried out, the double-speed reproduction is not carried out instantly and the quadruple-speed reproduction is continued for a while. Then, the double-speed reproduction is started. As a result, even when the user manipulates the editor unit 1 so as to carry out the double-speed reproduction from the quadruple-speed reproduction, the speed is not switched instantly from the quadruple-speed reproduction to the double-speed reproduction. The slow response to the manipulation of the user gives bad impression to the user in terms of the controllability and usability.

Then, when the user requests to decelerate the reproducing speed from the quadruple-speed reproduction to the double-speed reproduction or the single-speed reproduction for example by manipulating through the editor unit 1, the controller section 40 of the IOP 13*j* (FIG. 4) realizes the double-speed reproduction or single-speed reproduction in so to speak pseudo manner by controlling the image output I/F 54 so as to read the divisional data for the requested double-speed reproduction or single-speed reproduction from the HDDs 20W through 20Z and to read a part of the divisional data for the quadruple-speed reproduction stored in the temporary storage sections 53W through 53Z in duplicate based on the current reproducing speed (here the quadruple speed for example) and the requested reproducing speed (here double-speed or single-speed for example) during when the divisional data can be stored in the temporary storage sections 53W through 53Z.

That is, when the quadruple-speed reproduction is being carried out, the controller section 40 controls so as to read the divisional data of 16 frames for the quadruple-speed reproduction from the HDDs 20W through 20Z as explained in FIG. 13 in the time slot n and to store in the temporary storage sections 53W through 53Z as shown in FIG. 14.

In this case, when the user requests the double-speed reproduction for example, the image output I/F 54 reads the divisional data with the patterns corresponding to the quadruple-speed, i.e., the current reproducing speed, and the double-speed, i.e., the requested reproducing speed, from the temporary storage sections 53W through 53Z and structures the reproduced image of the double-speed reproduction in pseudo by using the read divisional data.

That is, when the user requests to decelerate the speed from the quadruple-speed reproduction to the double-speed reproduction, the image output I/F 54 reads four divisional data as surrounded by thick lines in FIG. 15A as a reproduced image of one frame from the image temporary storage section 53 in the direction as indicated by an arrow in the figure so that the two divisional data duplicate in the reproduced image of each frame.

In this case, the four divisional data read by the image output I/F 54 as the reproduced image of one frame contain one each of the divisional data of the groups A through D and the image output I/F 54 structures the reproduced image of one frame by disposing the divisional data of the groups A through D at the position corresponding to each group. That is, when the reproduced image of one frame is divided by the image group dividing section 42 (FIG. 4) into the divisional data of the groups A, B, C and D one after another from the top as shown in FIG. 5A, the image output I/F 54 structures the reproduced image of one frame by disposing the divisional data of the groups A through D sequentially from the top of the frame.

Accordingly, the reproduced image of the first frame is structured by reading the divisional data 1-MA in the group A of the first frame of the original image, the divisional data 2-MB in the group B of the second frame of the original image, the divisional data 3-MC in the group C of the third frame of the original image and the divisional data 4-MD in the group D of the fourth frame of the original image at first and by disposing them from the top of the frame in the order of the groups A, B, C and D.

Then, the reproduced image of the second frame is structured by reading the divisional data 3-MC in the group C of the third frame of the original image and the divisional data 4-MD in the group D of the fourth frame of the original image and by reading the divisional data 5-MA in the group A of the fifth frame of the original image and the divisional data 6-MB in the group B of the sixth frame of the original image anew and by disposing them from the top of the frame in the order of the groups A, B, C and D. The reproduced images of the third frame and thereafter are structured in the same manner by reading again two divisional data out of the divisional data previously read and by reading two divisional data anew.

Accordingly, while a half of the previously reproduced frames is contained in each frame of the reproduced image in duplicate in this case, the reproducing speed is double-speed.

When the requests to decelerate the speed from the quadruple-speed reproduction to the single-speed reproduction, the image output I/F 54 reads four divisional data as surrounded by thick lines in FIG. 15B as a reproduced image of one frame from the image temporary storage section 53 in the direction as indicated by an arrow in the figure so that the three divisional data duplicate in the reproduced image of each frame.

In this case, the four divisional data read by the image output I/F 54 as the reproduced image of one frame contain one each of the divisional data of the groups A through D and the image output I/F 54 structures the reproduced image of one frame by disposing the divisional data of the groups A through D at the position corresponding to each group. That is, when the reproduced image of one frame is divided by the image group dividing section 42 (FIG. 4) into the divisional data of the groups A, B, C and D one after another from the top as shown in FIG. 5A, the image output I/F 54 structures the reproduced image of one frame by disposing the divisional data of the groups A through D sequentially from the top of the frame.

Accordingly, the reproduced image of the first frame is structured by reading the divisional data 1-MA in the group A of the first frame of the original image, the divisional data 2-MB in the group B of the second frame of the original image, the divisional data 3-MC in the group C of the third frame of the original image and the divisional data 4-MD in the group D of the fourth frame of the original image at first and by disposing them from the top of the frame in the order of the groups A, B, C and D.

Then, the reproduced image of the second frame is structured by reading the divisional data 2-MB in the group B of the second frame of the original image, the divisional data 3-MC in the group C of the third frame of the original image and the divisional data 4-MD in the group D of the fourth frame of the original image again, by reading the divisional data 5-MA in the group A of the fifth frame of the original image anew and by disposing them from the top of the frame in the order of the groups A, B, C and D. The reproduced images of the third frame and thereafter are structured in the same manner by reading again three divisional data out of the divisional data previously read and by reading one divisional data anew.

Accordingly, while ¾ of the previously reproduced frames is contained in each frame of the reproduced image in duplicate in this case, the reproducing speed is single-speed.

As described above, the double-speed reproduction or the single-speed reproduction may be carried out in the pseudo manner by reading a part of the divisional data for the quadruple-speed reproduction out of the temporary storage sections 53W through 53Z in duplicate. Accordingly, when the user manipulates to decelerate the speed, the apparatus can react to that instantly, thus improving the controllability and the usability of the system as a result.

It is noted that although the case of switching from the quadruple-speed reproduction to the double-speed reproduction or the single-speed reproduction has been described above, it is possible to deal with the deceleration other than that (e.g., switching from the double-speed reproduction to the single-speed reproduction) in the same manner.

The image data temporary storage section 53 (the temporary storage sections 53W through 53Z) in the IOP 13j (FIG. 4) is composed of three banks to simultaneously carry out the storage and reading of data as described above. Then, these banks will be denoted now as #1, #2 and #3 and the operation of the IOP 13j when the user requests to decelerate the speed from the quadruple-speed reproduction to the double-speed reproduction for example will be explained while taking these banks into account with reference to FIGS. 16 and 17.

It is noted that in the IOP 13j, the divisional data read out of the HDDs 20W through 20Z is overwritten to one of the three banks #1, #2 and #3 of the image data temporary storage section 53 in which the divisional data of the frame separated most from the currently reproduced frame in order to be able to react instantly to a manipulation for reversing the reproducing direction. Accordingly, when the divisional data from the HDDs 20W through 20Z is stored to the banks #1 through #3 in that order when the reproduction is being carried out at certain reproducing speed for example, divisional data to be read out of the HDDs 20W through 20Z next is stored in the bank #1. In this case, the image output I/F 54 reads the divisional data sequentially in the order of #1, #2, #3 and #1, . . . from the banks #1 through #3 to structure the reproduced image.

Figure 16:
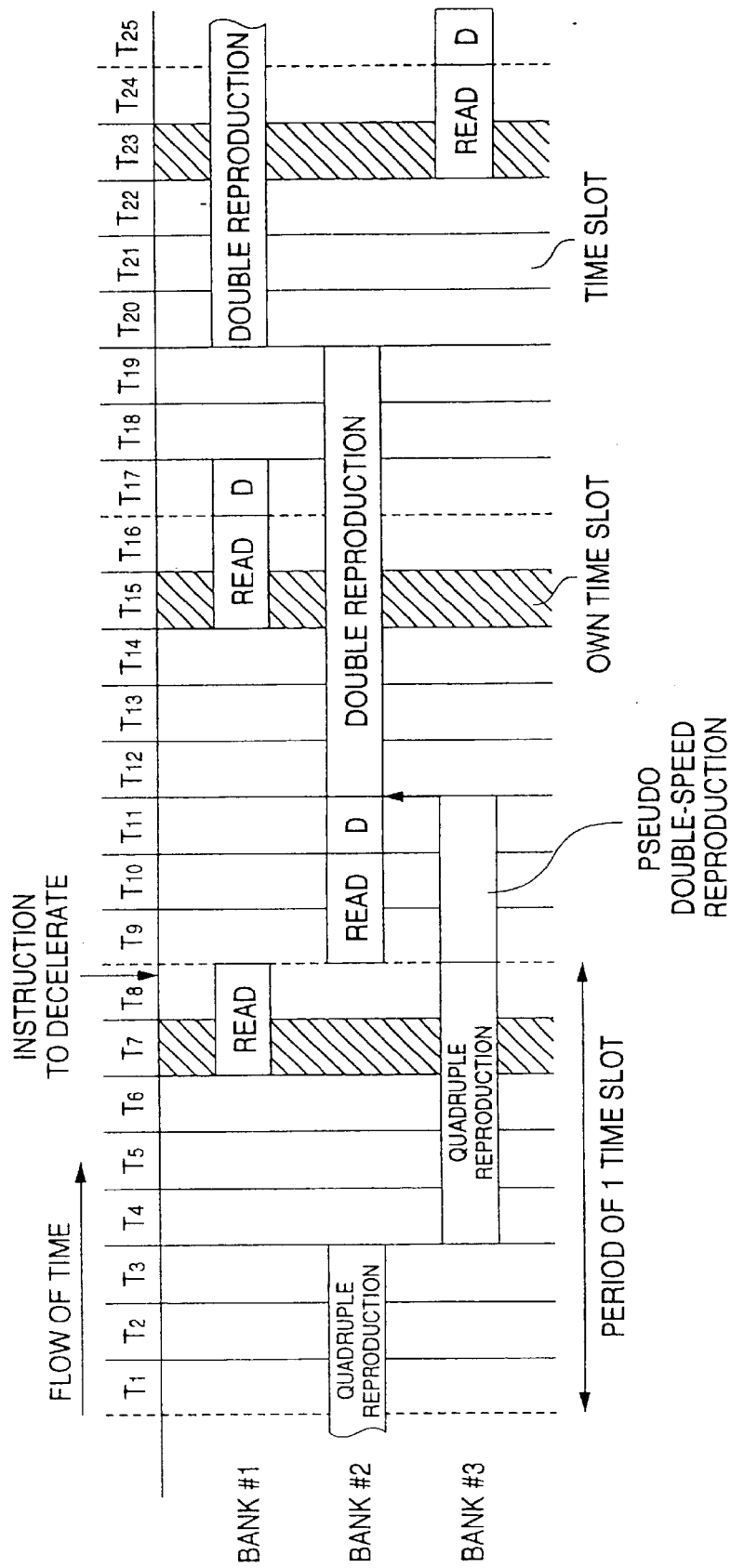
FIG. 16 is a time chart for explaining the operation during reproduction when the image data temporary storage section is composed of three banks.
Figure 17:
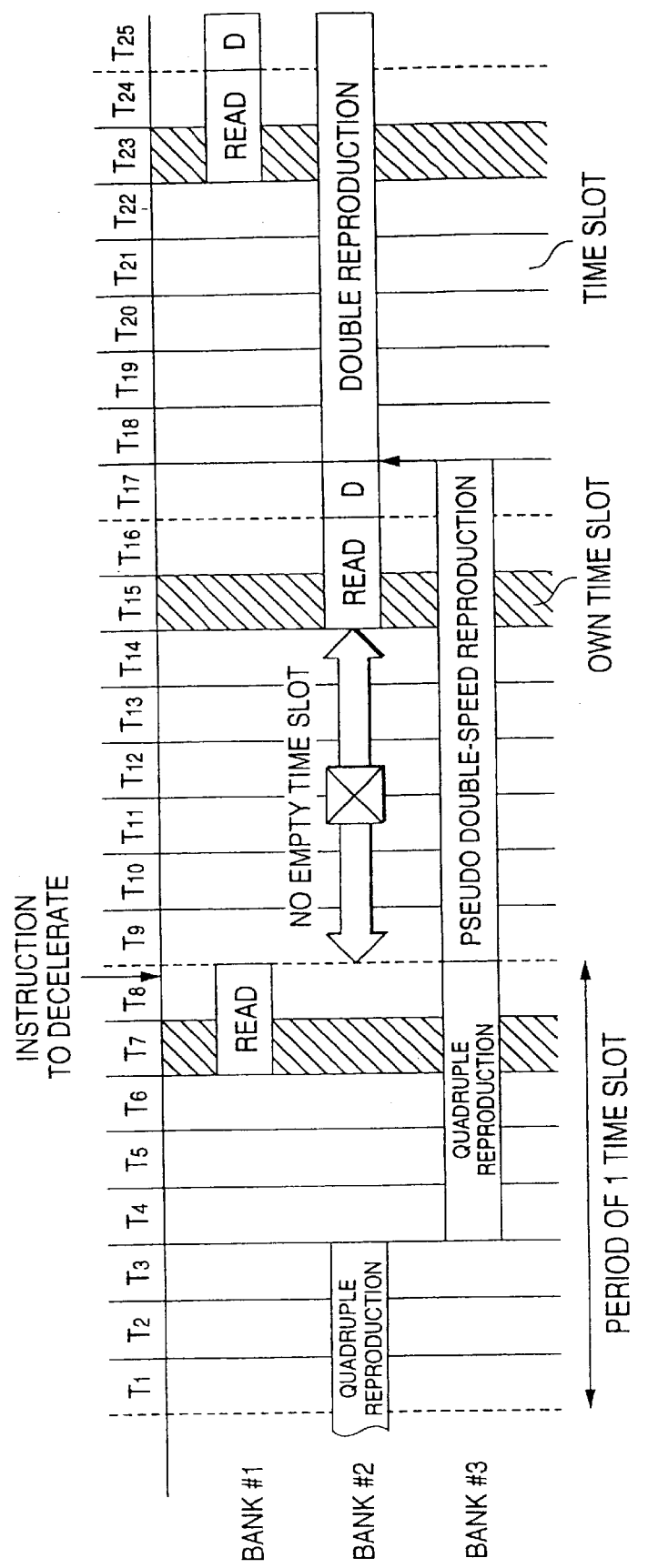
FIG. 17 is a time chart for explaining the operation during reproduction when the image data temporary storage section is composed of three banks.

Here, the horizontal direction represents an elapse of time and the vertical direction represents the banks in FIGS. 16 and 17. The interval between dotted lines in the horizontal direction represents the time slot period and the interval between the solid lines represents the time slot. Accordingly, in the embodiment in FIGS. 16 and 17, the time slot period is composed of eight time slots and the AV server 10 is an eight channel multi-channel AV server. It is noted that in this case, the respective one of the banks #1 through #3 has a capacity for storing divisional data for reproducing continuously for the time corresponding to the eight time slots which is the time slot period.

Assume now that the divisional data for the quadruple-speed reproduction is read sequentially from the HDDs 20W through 20Z as shown in FIG. 13 and is stored in the respective one of the three banks #1 through #3 of the image data temporary storage section 53 as shown in FIG. 14. Assume also that the quadruple-speed reproduction is being carried out by reading the divisional data for the quadruple-speed reproduction from the bank #2 for example among the three banks #1 through #3.

In FIG. 16 (the same applies also to FIG. 17), the divisional data for the quadruple-speed reproduction for carrying out the quadruple-speed reproduction is stored till the time slot T3 in the bank #2 and when all the data is read, the quadruple-speed reproduction is carried out by switching the bank from the bank #2 to the bank #3 and by reading the divisional data for the quadruple-speed reproduction from the bank #3 from the time slot T4.

Meanwhile, when time slots T7, T15, T23, . . . indicated by hatch in FIG. 16 (the same also in FIG. 17) are assigned periodically as own time slots to the channel of the IOP 13j, the HDD input I/F 51 of the IOP 13j reads the latest divisional data for the quadruple-speed reproduction from the HDDs 20W through 20Z (the divisional data for the quadruple-speed reproduction to be reproduced next to the divisional data for the quadruple-speed reproduction read in the previous time slot) when the own time slot T7 comes. Then, the HDD input I/F 51 supplies the latest divisional data for quadruple-speed reproduction to the bank storing the divisional data separated most to store therein.

That is, the divisional data is being read from the bank #3 in the time slot T7 and in this case, the bank storing the divisional data separated most is the bank #1. Accordingly, the divisional data read out of the HDDs 20W through 20Z in the time slot T7 is stored in the bank #1.

Here, the divisional data is read out of the HDDs 20W through 20Z by controlling the HDDs 20W through 20Z so that the IOP 13j transmits a read command to the disk array units 111 through 114 (FIG. 3) and the disk array units 111 through 114 reads required data by receiving that command. Then, the divisional data read as described above is transferred from the disk array units 111 through 114 to the IOP 13j. Therefore, one time slot is required to transmit the read command and one time slot is also required to transfer the divisional data from the disk array units 111 through 114 to the IOP 13j. That is, two time slots are required substantially to read the divisional data from the HDDs 20W through 20Z (or more accurately, to transfer the divisional data from the disk array units 111 through 114 to the IOP 13j).

Then, FIG. 16 (the same applies also in FIG. 17) shows such that the divisional data is read from the HDDs 20W through 20Z not only in the own time slot T7 of the IOP 13j but also in the next time slot T8. It is noted that because the divisional data is read out of the HDDs 20W through 20Z in the similar timing also in the other channel, the read command outputted by the IOP of each channel to the disk array unit and the data outputted by the disk array unit to the IOP of each channel will not butt from each other.

When the divisional data read out of the HDDs 20W through 20Z is stored in the bank #1 in the time slot T7 (and T8) as described above, the bank is switched from the bank #3 to the bank #1 when all of the divisional data stored in the bank #3 is read/reproduced.

Assume now that the user has made a request to decelerate the reproducing speed from the quadruple-speed reproduction to the double-speed reproduction just before ending the time slot T8 (just before starting the time slot T9) for example. In this case, because the divisional data stored in all of the banks #1 through #3 is the divisional data for quadruple-speed reproduction, the normal double-speed reproduction cannot be carried out instantly.

Then, the IOP 13j carries out the pseudo double-speed reproduction by using the data for quadruple-speed reproduction as described above until when data for double-speed reproduction can be obtained.

That is, in this case, the controller section 40 requests the manager unit 14 (FIG. 1) to assign a time slot of another channel. Then, the manager unit 14 retrieves an IOP which needs not to access to the disk array units 111 through 114 (IOP which is executing no process for example) and when such IOP exists, it assigns the time slot of the channel of that IOP to the IOP 13j exceptionally.

In FIG. 16, the time slot T9 next to the time slot T8 in which the deceleration request (instruction to decelerate) has been made is a so-called empty time slot (a time slot assigned to the IOP which needs not to access to the disk array units 111 through 114) and is assigned to the IOP 13j exceptionally.

In this case, the HDD input I/F 51 of the IOP 13j reads the divisional data for double-speed reproduction from the HDDs 20W through 20Z in the time slot T9 and supplies it to the bank #2 which is the bank storing the divisional data separated most at this point of time to store therein. Because the time of two time slots is required to read the divisional data from the HDDs 20W through 20Z to store in the bank #2 as described above, the storage of the divisional data for double-speed reproduction into the bank #2 is completed in the time slot T10.

The image output I/F 54 implements other required processes such as decoding (indicated by D in FIGS. 16 and 17) to the divisional data for double-speed reproduction stored in the bank #2 and structures the reproduced image by using the divisional data for double-speed reproduction in the time slot T12 and thereafter. Thereby, the so-called normal double-speed reproduction is carried out.

It is note d that according to the embodiment in FIG. 16 (the same applies also in FIG. 17), it is arranged so as to be able to reproduce by a predetermined reproducing speed continuously for the time corresponding to the time slot period by the divisional data for reproduction of the predetermined reproducing speed stored in a certain bank. Accordingly, the double-speed reproduction started from the time slot T12 by using the divisional data for double-speed reproduction stored in the bank #2 completes in the time slot T19 elapsed by the time slot period from the time slot T12.

When the time slot T15 which is the own time slot of the IOP 13j comes when the double-speed reproduction started from the time slot T12 is being carried out by using the divisional data for double-speed reproduction stored in the bank #2, the latest divisional data for double-speed reproduction is reread from the HDDs 20W through 20Z in the time slots T15 and T16 and is supplied to the bank #1 which is the bank storing the divisional data separated most to store therein. Then, the divisional data for double-speed reproduction stored in the bank #1 is decoded in the next time slot T17 for example and is read and is reproduced when the double-speed reproduction is completed by using the divisional data for double-speed reproduction stored in the bank #2, i.e., when the time slot T20 comes.

Then, when the time slot T23, i.e., the next own time slot of the IOP 13j, comes, the latest divisional data for double-speed reproduction is read out of the HDDs 20W through 20Z and is supplied to the bank #3 which is the bank storing the divisional data separated most to be stored therein. Then, the divisional data for double-speed reproduction stored in the bank #3 is decoded in the next time slot T25 for example and is then reproduced in the same manner.

By the way, because the reproduction (double-speed reproduction) may be carried out by using the divisional data for double-speed reproduction on and after the time slot T12 as described above and the divisional data for double-speed reproduction is not stored in any of the banks #1 through #3 from the time slot T9 right after the request of deceleration till the time-slot T12, the normal double-speed reproduction cannot be carried out according to the embodiment of FIG. 16.

Then, the pseudo double-speed reproduction is carried out by using the data for quadruple-speed reproduction stored in the bank #3 reproduced when the deceleration request has been made during the period from the time slots T9 to T12.

Accordingly, the pseudo double-speed reproduction is carried out by the time of three time slots after the deceleration request and thereafter, the normal double-speed reproduction is carried out in the embodiment of FIG. 16.

Because the time slot T9 right after the time slot T in which the deceleration request has been made has been an empty time slot in FIG. 16, the divisional data for double-speed reproduction may be read out of the HDDs 20W through 20Z relatively quickly after the deceleration request by assigning that empty time slot.

In contrary to that, FIG. 17 shows a case when there is no empty time slot after the time slot T8 in which the deceleration request has been made.

When there is no empty time slot, the IOP 13j must wait until when the time slot T15, i.e., the next own time slot, comes to read the divisional data for double-speed reproduction out of the HDDs 20W through 20Z. Still more, it takes the time of three time slots as explained in FIG. 16 until when the divisional data for double-speed reproduction is read out of the HDDs 20W through 20Z to use in the double-speed reproduction. Accordingly, when there is no empty time slot, the normal double-speed reproduction cannot be carried out until the time slot T17 after the next own time slot T15 by three time slots.

Then, the pseudo double-speed reproduction is carried out by using the data for quadruple-speed reproduction stored in the bank #3 during the time from the time slot T9 right after the deceleration request till the time slot T17 in this case.

Therefore, according to the embodiment in FIG. 17, the pseudo double-speed reproduction is carried out by the time of nine time slots from when the deceleration request has been made and the normal double-speed reproduction is carried out thereafter.

Here, in switching from the quadruple-speed reproduction to the pseudo double-speed reproduction, data is read from the image temporary storage section 53 with the pattern as described in FIG. 15 from the next divisional data of the divisional data for quadruple-speed reproduction used in the quadruple-speed reproduction just before the switching.

When the deceleration request from the quadruple-speed reproduction to the double-speed reproduction has been made, the timing for starting the normal double-speed reproduction differs depending whether there is an empty time slot or not. Therefore, the timing for starting the normal double-speed reproduction is calculated right after the deceleration request and the divisional data for double speed reproduction is read out of the HDDs 20W through 20Z so that the frames of the reproduced image continue naturally in switching from the pseudo double-speed reproduction to the normal double-speed reproduction.

It is noted that the controller section 40 controls the operation for reading the divisional data as described above.

Figure 18:
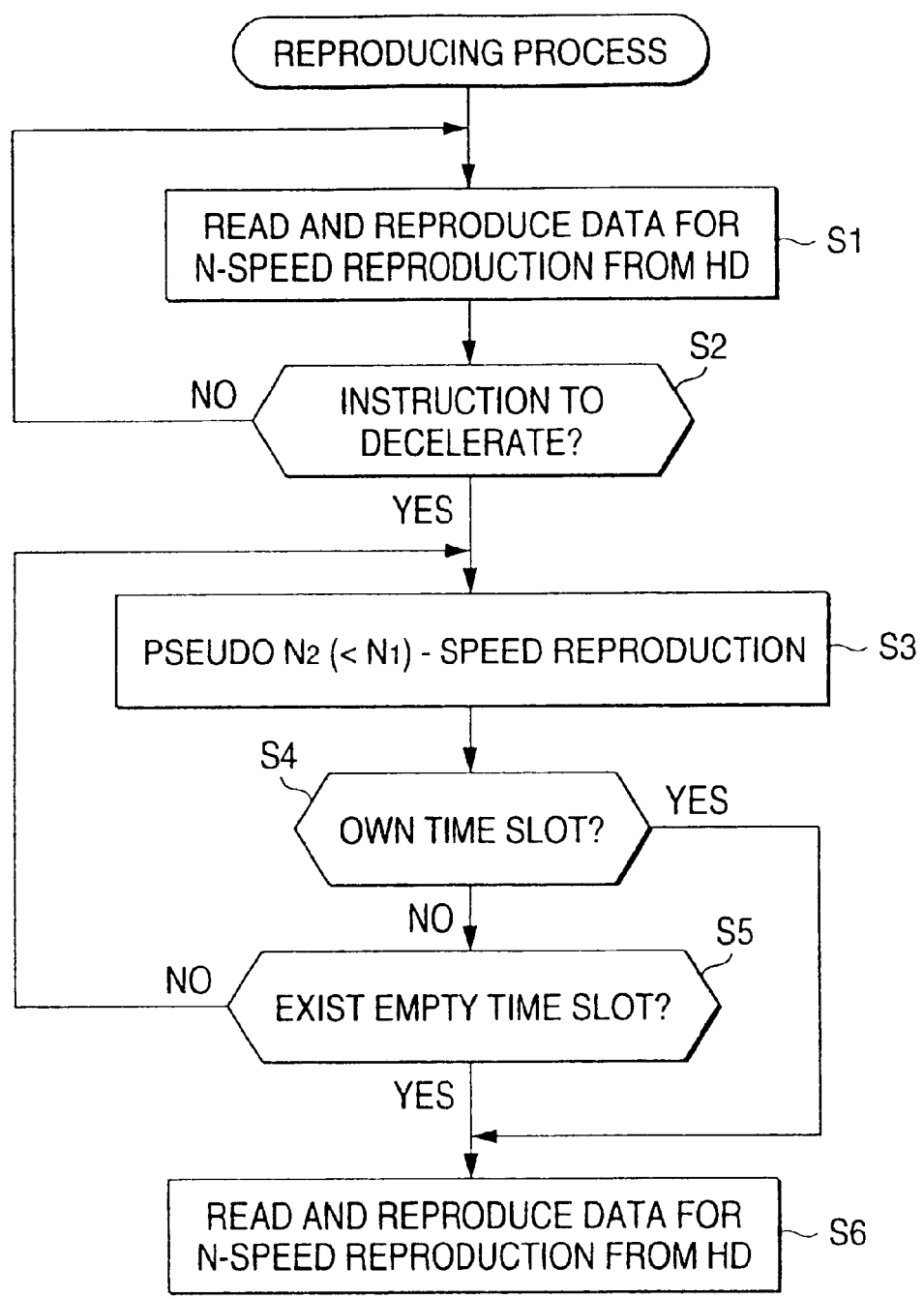
FIG. 18 is a flowchart for explaining a reproducing process by means of the IOP.

Next, the image reproducing process in the IOP 13j will be explained with reference to a flowchart in FIG. 18.

When the user manipulates the editor unit 1 to request to reproduce at N1-speed, the IOP 13j reads the divisional data for N1-speed from the disk array units 111 through 114 to structure frames of a reproduced image to be outputted. That is, thereby the N1-speed reproduction is carried out. Then, it is judged in Step S2 whether a deceleration request from the N1-speed reproduction to N2 (N1>N2)-speed reproduction has been made by the user by manipulating the editor unit 1. When it is judged in Step S2 that there has been no deceleration request, the process returns to Step S1 to continue the N1-speed reproduction.

When it is judged that the deceleration request has been made in Step S2, the process advances to Step S3 to carry out the N2-speed reproduction in the pseudo manner by using the divisional data for N1-speed reproduction.

Then, the process advances to Step S4 to judge whether the current time slot is the own time slot or not and when it is judged to be own time slot, the process advances to Step S6 by skipping Step S5. The divisional data for N2-speed reproduction is read out of the disk array units 111 through 114 in own time slot in Step S6 to structure of frames of a reproduced image to be outputted. That is, thereby the normal N2-speed reproduction is carried out instead of the pseudo N2-speed reproduction.

When the current time slot is judged not to be own time slot in Step S5 on the other hand, the process advances to Step S5 to judge whether the current time slot is an empty time slot or not. When the current time slot is judged not to be an empty time slot in Step S5, the process returns to Step S3 to continue the pseudo N2-speed reproduction.

When the current time slot is judged to be an empty time slot in Step S5, the process advances to Step S6 to read the divisional data for N2-speed reproduction out of the disk array units 111 through 114 to structure frames of the reproduced image to be outputted. That is, thereby the normal N2-speed reproduction is carried out instead of the pseudo N2-speed reproduction.

It is noted that the image is divided into groups per one frame in the present embodiment, it is also possible to divide the image into groups per IGOP as disclosed in Japanese Patent Application No. Hei. 10-122535 previously applied by the applicant of the present invention.

The present invention is also applicable without depending on the RAID scheme.

As described above, according to the image reproducing apparatus and the image reproducing method of the invention, when a request to reproduce an image is made, the image reproducing apparatus reads divisional data of the part corresponding to the requested reproducing speed out of the plurality of groups of recording media to store in storage means. Then, it reads the divisional data stored in the storage means while controlling its reading pattern and structures a reproduced image by using the divisional data. Accordingly, it becomes possible to structure the reproduced image by the various reproducing speeds by the pattern in reading the divisional data. Thereby, when the change of the reproducing speed is requested for example, the shift of the reproducing speed may be carried out instantly. Then, as a result, the controllability of the apparatus may be improved.

While the preferred embodiments have been described, variations thereto will occur to those skilled in the art within the scope of the present inventive concepts which are delineated by the following claims.

What is claimed is:

1. An image reproducing apparatus for reproducing images by generating divisional data spatially divided into a plurality of groups by dividing image data per predetermined data unit;

by recording said divisional data into recording media of spatially divided groups so that the relationship between the groups of said divisional data and the groups of the plurality of recording media spatially divided into the plurality of groups corresponding to the number of groups of said divisional data changes periodically with a certain pattern per said predetermined data unit; and by reading said divisional data from said plurality of recording media in which said image data is recorded, said image reproducing apparatus comprising:

reading means for reading said divisional data of part corresponding to requested reproducing speed from said plurality of groups of recording media when a request to reproduce images is made;

storage means for storing said divisional data read out of said plurality of groups of recording media;

structuring means for structuring the reproduced image by reading and using said divisional data stored in said storage means; and control means for controlling said certain pattern for reading said divisional data out of said storage means.

2. The image reproducing apparatus according to claim 1, wherein said control means controls so as to read the part of said divisional data in duplicate from said storage means based on the current reproducing speed and the requested reproducing speed when a request to decelerate said reproducing speed is made.

3. The image reproducing apparatus according to claim 2, wherein said control means controls so as to read the part of said divisional data stored in said storage means in duplicate until when said reading means reads said divisional data of the part corresponding to the requested reproducing speed out of each of said plurality of groups of recording media when a request to decelerate the reproducing speed is made.

4. The image reproducing apparatus according to claim 3, further comprising requesting means for requesting to use said plurality of recording media when the request to decelerate the reproducing speed is made at timing in which said plurality of recording media cannot be used in case when said plurality of recording media are shared among other apparatuses and time during which said plurality of recording media can be used is periodically assigned; and said reading means reads said divisional data of the part corresponding to the requested reproducing speed instantly from each of said plurality of groups of recording media when the use of said plurality of recording media is allowed with respect to the request of said requesting means.

5. An image reproducing method for reproducing images by generating divisional data spatially divided into a plurality of groups by dividing image data per predetermined data unit;

by recording said divisional data into recording media of spatially divided groups so that the relationship between the groups of said divisional data and the groups of the plurality of recording media spatially divided into the plurality of groups corresponding to the number of groups of said divisional data changes periodically with a certain pattern per said predetermined data unit; and by reading said divisional data from said plurality of recording media in which said image data is recorded, said image reproducing method comprising steps of:

reading said divisional data of the part corresponding to requested reproducing speed from each of said plurality of groups of recording media when a request to reproduce images is made;

storing said divisional data read out of said plurality of groups of recording media into storage means;

structuring the reproduced image by reading and using said divisional data stored in said storage means; and controlling said certain pattern for reading said divisional data out of said storage means.

6. A data recording/reproducing apparatus having recording/reproducing means for recording data including image data to randomly accessible recording media and for reproducing said data recorded in said recording media; and a plurality of input/output processing means for outputting said data inputted from the outside to said recording/reproducing means in an assigned time slot period and for inputting said data outputted from said recording/reproducing means in said time slot period to output to the outside;

said data recording/reproducing apparatus comprising said input/output processing means each having:

data dividing means for spatially dividing said inputted image data into a plurality of data per predetermined unit to generate divisional data divided into a plurality of groups;

output means for outputting said divisional data outputted from said data dividing means to said recording/reproducing means during said time slot period;

storage means for storing said divisional data outputted from said recording/reproducing means during said time slot period; and image data generating means for generating desired image data by controlling a pattern for reading said divisional data stored in said storage means;

wherein said data recording/reproducing means records said divisional data outputted from said input/output processing means to said plurality of recording media spatially divided into a plurality of groups in correspondence to the number of groups of said divisional data and reproduces said divisional data of the part corresponding to the requested reproducing speed from said plurality of groups of recording media when control data instructing the reproduction is inputted; and said control means controls said recording/reproducing means so that said divisional data is recorded in said recording media of the different groups so that the relationship between the number of groups of said divisional data and the group of said recording media changes periodically with said pattern per predetermined data unit.

7. A data recording/reproducing method for recording data including image data to randomly accessible recording media and for reproducing said data recorded in said recording media, comprising:

a first step of spatially dividing said image data inputted from the outside into a plurality of data per predetermined unit to generate said divisional data divided into a plurality of groups;

a second step of recording said divisional data generated in the first step to said recording media in a time slot period and of outputting said data recorded in said recording media to recording/reproducing means for reproducing said data;

a third step of recording said divisional data outputted in the second step to said recording media spatially divided into a plurality of groups in correspondence to a number of groups of said divisional data while changing the relationship between the number of groups of said divisional data and the groups of said recording media in a certain pattern per predetermined data unit;

a fourth step of reproducing said divisional data of the part corresponding to the requested reproducing speed from each of said plurality of groups of recording media when a control data instructing to reproduce the image is inputted;

a fifth step of outputting said divisional data reproduced in the fourth step during said time slot period;

a sixth step of storing said divisional data outputted in the fifth step;

a seventh step of controlling the pattern of reading said divisional data stored in the sixth step to generate desired image data; and an eighth step of out putting said image data generated in the seventh step to the outside.

* * * * *